United States Patent
Kim

(10) Patent No.: US 11,665,445 B2
(45) Date of Patent: May 30, 2023

(54) IMAGE SENSING DEVICE FOR CANCELLING A HORIZONTAL BANDING NOISE

(71) Applicant: SK hynix Inc., Gyeonggi-do (KR)

(72) Inventor: Jeong Hoon Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 16 days.

(21) Appl. No.: 17/347,841

(22) Filed: Jun. 15, 2021

(65) Prior Publication Data

US 2022/0286628 A1 Sep. 8, 2022

(30) Foreign Application Priority Data

Mar. 3, 2021 (KR) .......................... 10-2021-0028172

(51) Int. Cl.
*H04N 25/616* (2023.01)
*H04N 25/75* (2023.01)
*H04N 25/766* (2023.01)

(52) U.S. Cl.
CPC ........... *H04N 25/616* (2023.01); *H04N 25/75* (2023.01); *H04N 25/766* (2023.01)

(58) Field of Classification Search
CPC ..... H04N 5/3575; H04N 5/3741; H04N 5/378
See application file for complete search history.

(56) References Cited

U.S. PATENT DOCUMENTS

| | | | |
|---|---|---|---|
| 7,741,589 B2 | 6/2010 | Moholt et al. | |
| 10,110,783 B2 | 10/2018 | Webster | |
| 10,321,080 B2 | 6/2019 | Kim et al. | |
| 10,574,917 B2 | 2/2020 | Kim et al. | |
| 2005/0224841 A1* | 10/2005 | Nakamura | H04N 5/3597 348/E3.021 |
| 2009/0273694 A1* | 11/2009 | Krymski | H04N 5/378 348/308 |

FOREIGN PATENT DOCUMENTS

| | | |
|---|---|---|
| KR | 10-2011-0018104 | 2/2011 |
| KR | 10-2015-0020424 | 2/2015 |
| KR | 10-2012767 | 8/2019 |
| KR | 10-2020-0011717 | 2/2020 |

* cited by examiner

*Primary Examiner* — Nicholas G Giles
(74) *Attorney, Agent, or Firm* — IP & T Group LLP

(57) ABSTRACT

An image sensing device includes a pixel array including a plurality of unit pixels coupled to a plurality of row lines, wherein at least one of the unit pixels includes a photo-diode for generating photo charges corresponding to an incident light and a transfer transistor for transferring the photo charges to a floating diffusion (FD) node in response to a transfer control signal transferred through a corresponding row line; a row control circuit disposed at a first side of the pixel array and suitable for providing, to the respective row lines, the transfer control signal having a voltage level between a first voltage and a second voltage; and a bias compensation circuit disposed at a second side of the pixel array and suitable for driving the transfer control signal to the second voltage during a reset read-out section of each of the row lines.

20 Claims, 16 Drawing Sheets

IMAGE SENSING DEVICE FOR CANCELLING A HORIZONTAL BANDING NOISE

CROSS-REFERENCE TO RELATED APPLICATION

The present application claims priority of Korean Patent Application No. 10-2021-0028172, filed on Mar. 3, 2021, which is herein incorporated by reference in its entirety.

BACKGROUND

1. Field

The disclosure relates to semiconductor design technology, and specifically to, an image sensing device for cancelling a horizontal banding noise.

2. Description of the Related Art

An image sensor is a device that captures light from an optical image or one or more objects using photosensitive semiconductor elements and converts the captured color light into electrical signals. With the recent development of automotive, medical, computer, and communication industries, the demand for high-performance image sensors is increasing in various devices such as smartphones, digital cameras, game consoles, Internet of Things (IoT), robots, surveillance cameras, medical micro-cameras, etc.

One common type of image sensing device is a charge coupled device (CCD), which has dominated the field of image sensors for a long time. Another common type of image sensing device is a complementary metal oxide semiconductor (CMOS) image sensing device. The CCD image sensors have advantages over the CMOS image sensor in terms of noise characteristics and image quality. However, the CMOS image sensors are now widely used due to advantages over the CCD counterparts, including, e.g., higher frame rates and shutter speed. In addition, the CMOS image sensors and signal processing circuitry can be integrated into a single chip, making it possible to miniaturize electronic devices while achieving lower power consumption. In addition, using the CMOS fabrication technology can result reduction in the production costs. Such characteristics of the CMOS image sensors make these sensors better suited for implementations in mobile devices.

SUMMARY

Various embodiments are directed to an image sensing device capable of cancelling or minimizing a horizontal banding noise that may occur between pixels at the same row during a reset read-out section.

According to one embodiment, an image sensing device includes a pixel array including a plurality of unit pixels coupled to a plurality of row lines, wherein at least one of the unit pixels includes a photo-diode for generating photo charges corresponding to an incident light and a transfer transistor for transferring the photo charges to a floating diffusion (FD) node in response to a transfer control signal transferred through a corresponding row line; a row control circuit disposed at a first side of the pixel array and suitable for providing, to the respective row lines, the transfer control signal having a voltage level between a first voltage and a second voltage; and a bias compensation circuit disposed at a second side of the pixel array and suitable for driving the transfer control signal to the second voltage during a reset read-out section of each of the row lines.

According to one embodiment, an image sensing device includes a pixel array including a plurality of unit pixels coupled to a plurality of row lines, wherein each unit pixel includes a photo-diode for generating photo charges corresponding to an incident light and a transfer transistor for transferring the photo charges to a floating diffusion (FD) node in response to a transfer control signal transferred through a corresponding row line; a first row control circuit disposed at a first side of the pixel array and suitable for providing, to odd row lines among the row lines, the transfer control signal having a voltage level between a first voltage and a second voltage; a second row control circuit disposed at a second side of the pixel array and suitable for providing, to even row lines among the row lines, the transfer control signal; a first bias compensation circuit disposed at the second side and suitable for driving the transfer control signal to the second voltage during a reset read-out section of the odd row lines; and a second bias compensation circuit disposed at the first side and suitable for driving the transfer control signal to the second voltage during a reset read-out section of the even row lines.

According to one embodiment, an image sensing device includes a pixel array including a plurality of unit pixels coupled to a plurality of row lines, wherein each unit pixel includes a photo-diode for generating photo charges corresponding to an incident light, a transfer transistor for transferring the photo charges to a floating diffusion (FD) node in response to a transfer control signal, and a gain transistor for coupling the FD node to a dynamic range capacitor in response to a gain control signal; a row control circuit disposed at a first side of the pixel array and suitable for providing, to the respective row lines, the gain control signal having a voltage level between a third voltage and a fourth voltage; and a bias compensation circuit disposed at a second side of the pixel array and suitable for driving the gain control signal to the third voltage during a reset read-out section of each of the row lines.

According to one embodiment, an image sensing device includes a pixel array including a plurality of unit pixels coupled to a plurality of row lines, wherein each unit pixel includes a photo-diode for generating photo charges corresponding to an incident light, a transfer transistor for transferring the photo charges to a floating diffusion (FD) node in response to a transfer control, and a gain transistor for coupling the FD node to a dynamic range capacitor in response to a gain control signal; a first row control circuit disposed at a first side of the pixel array and suitable for providing, to odd row lines among the row lines, the gain control signal having a voltage level between a third voltage and a fourth voltage; a second row control circuit disposed at a second side of the pixel array and suitable for providing, to even row lines among the row lines, the gain control signal; a first bias compensation circuit disposed at the second side and suitable for driving the gain control signal to the third voltage during a reset read-out section of the odd row lines; and a second bias compensation circuit disposed at the first side and suitable for driving the gain control signal to the third voltage during a reset read-out section of the even row lines.

According to one embodiment, an image sensing device includes unit pixels coupled to a row line and each including: a reset transistor configured to initialize a floating diffusion (FD) node in response to a reset signal; and a transfer transistor configured to transfer photo charges to the FD node in response to a transfer control signal; and a row control circuit and a bias compensation circuit disposed at opposite sides in a row direction with respect to the unit pixels and coupled to respective ends of the row line, wherein the row control circuit is configured to provide, through the row line, the reset signal and the transfer control signal having a voltage level between first and second voltages, and wherein the bias compensation circuit is configured to drive, through the row line, the transfer control signal to the second voltage during a section from disablement of the reset signal to enablement of the transfer control signal.

The first voltage has a voltage level equal to or higher than a source voltage level and the second voltage has a lower voltage level than a ground voltage level. Each of the unit pixels further includes a gain transistor configured to couple the FD node to a dynamic range capacitor in response to a gain control signa. The row control circuit is further configured to provide, through the row line, the gain control signal having a voltage level between third and fourth voltages, and the bias compensation circuit is further configured to drive, through the row line, the gain control signal to the third voltage during the section. The third voltage has a higher voltage level than a source voltage level and the fourth voltage has a voltage level equal to or lower than a ground voltage level.

According to one embodiment, an image sensing device includes unit pixels coupled to a row line and each including: a reset transistor configured to initialize a floating diffusion (FD) node in response to a reset signal; a transfer transistor configured to transfer photo charges to the FD node in response to a transfer control signal; a gain transistor configured to couple the FD node to a dynamic range capacitor in response to a gain control signal; and a row control circuit and a bias compensation circuit disposed at opposite sides in a row direction with respect to the unit pixels and coupled to respective ends of the row line, wherein the row control circuit is configured to provide, through the row line, the gain control signal having a voltage level between third and fourth voltages, and wherein the bias compensation circuit is configured to drive, through the row line, the gain control signal to the third voltage during a section from disablement of the reset signal to enablement of the transfer control signal.

The third voltage has a higher voltage level than a source voltage level and the fourth voltage has a voltage level equal to or lower than a ground voltage level.

According to the embodiments above, the image sensing device may be provided with a bias compensation circuit and a row control circuit disposed on opposite sides with reference to a pixel array, the bias compensation circuit suitable for driving row control signals to a low voltage or a high voltage during a reset read-out section. Thus, it is possible to reduce the horizontal banding noise component between the pixels at the same low.

DETAILED DESCRIPTION

Figure 1:
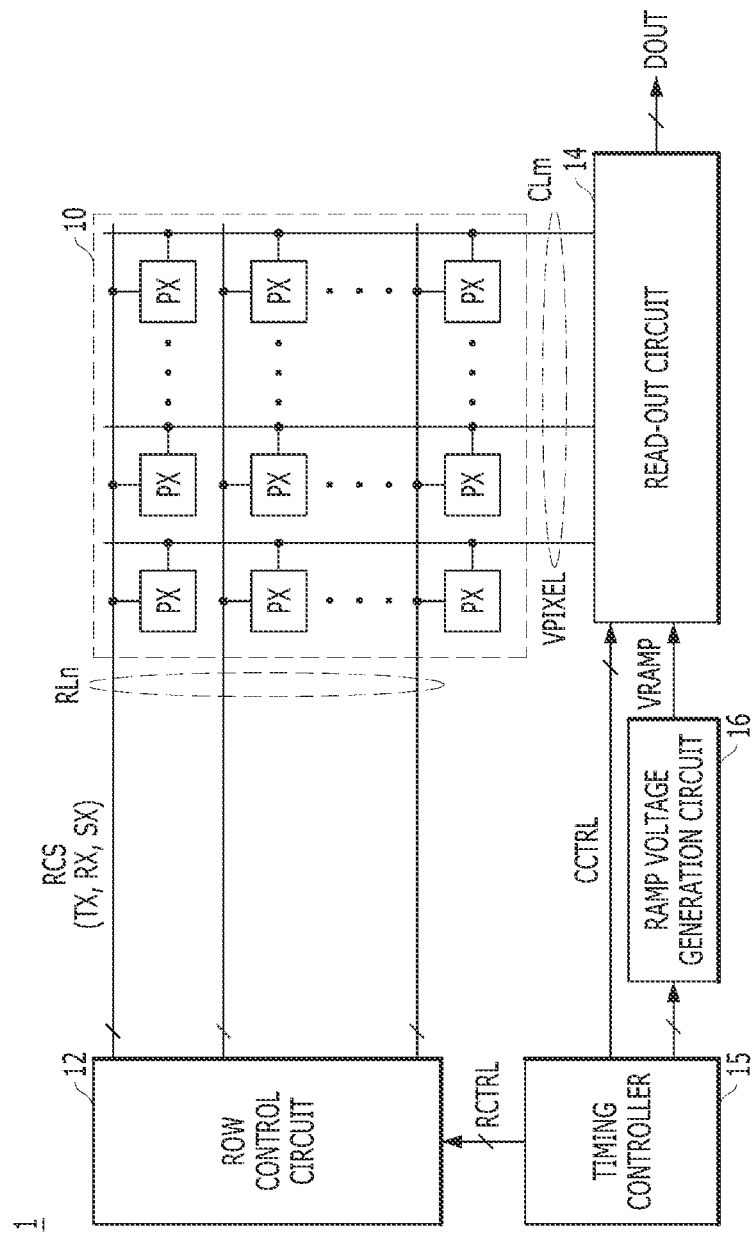
FIG. 1 is a configuration diagram illustrating an image sensing device.

Various embodiments are described below with reference to the accompanying drawings. The embodiments may, however, be embodied in different forms and thus should not be construed as limited to the embodiments set forth herein. Throughout the disclosure, like reference numerals refer to like parts throughout the various figures and embodiments of the present invention. It is noted that reference to "an embodiment," "another embodiment" or the like does not necessarily mean only one embodiment, and different references to any such phrase are not necessarily to the same embodiment(s). The term "embodiments" when used herein does not necessarily refer to all embodiments.

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without indicating any change in the element itself.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected; coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated dements and do not preclude the presence or addition of one or more other dements. As used herein, the term "and/or" includes any and all combinations of one or more of the associated listed items.

FIG. 1 is a configuration diagram illustrating an image sensing device 1.

Referring to FIG. 1, the image sensing device 1 may include a pixel array 10, a row control circuit 12, a read-out circuit 14, a timing controller 15, and a ramp voltage generation circuit 16.

The pixel array 10 may include a plurality of unit pixels PX arranged with an array type in a row direction and a column direction. The unit pixels PX may be coupled to the row control circuit 12 through a plurality of row lines RLn, and coupled to the read-out circuit 14 through a plurality of column lines CLm. Each of the unit pixels PX may include at least one of a red pixel for converting a light from a red spectrum area into an electrical signal, a green pixel for converting a light from a green spectrum area into an electrical signal, and a blue pixel for converting a light from a blue spectrum area into an electrical signal, thereby converting photo charges into electrical signals. The pixel array 10 may be controlled by row control signals RCS that are provided from the row control circuit 12 through the row lines RLn. The pixel array 10 may generate the photo charges corresponding to the amount of an incident light, accumulate the generated photo charges in a floating diffusion (FD) node, and provide an electrical signal corresponding to the photo charges, as a pixel voltage VPIXEL through the column lines CLm, by converting a voltage level of the FD node into the electrical signal.

The row control circuit 12 may generate the row control signals RCS including a transfer control signal TX, a reset signal RX, and a selection signal SX, according to a first timing control signal RCTRL provided from the timing controller 15, and provide the row control signals RCS to the pixel array 10 through the row lines RLn. The transfer control signal TX, the reset signal RX, and the selection signal SX may be provided for each of the row lines RLn. The row control circuit 12 may generate the selection signal SX for selecting any one from the row lines RLn according to the first timing control signal RCTRL. The row control circuit 12 may sequentially enable the reset signal RX and the transfer control signal TX at a preset timing, and output the reset signal RX and the transfer control signal TX to the unit pixels PX coupled to the selected row line, according to the first timing control signal RCTRL.

The timing controller 15 may generate first and second timing control signal RCTRL and CCTRL including a clock signal, thereby controlling the pixel array 10, the row control circuit 12, the read-out circuit 14, and the ramp voltage generation circuit 16.

The ramp voltage generation circuit 16 may generate a ramp voltage VRAMP that decreases (or increases) over time, depending on the control of the timing controller 15.

The read-out circuit 14 may convert the pixel voltage VPIXEL into digital signals based on the ramp voltage VRAMP according to the second timing control signal CCTRL, and output the digital signals as image data DOUT. The read-out circuit 14 may include a sampler, an analog-digital converter, and/or an output buffer. The sampler in read-out circuit 14 may sequentially sample and hold the pixel voltage VPIXEL transferred from the pixel array 10 to each of the column lines CLm. The analog-digital converter in read-out circuit 14 may convert the pixel voltage VPIXEL of analog signals provided from the sampler into the digital signals based on the ramp voltage VRAMP. The output buffer in read-out circuit 14 may output the image data DOUT in columns by latching the digital signals provided from the analog-digital converter, according to the second timing control signal CCTRL. The output buffer may include a column decoder for outputting the Image data DOUT in columns.

Figure 2:
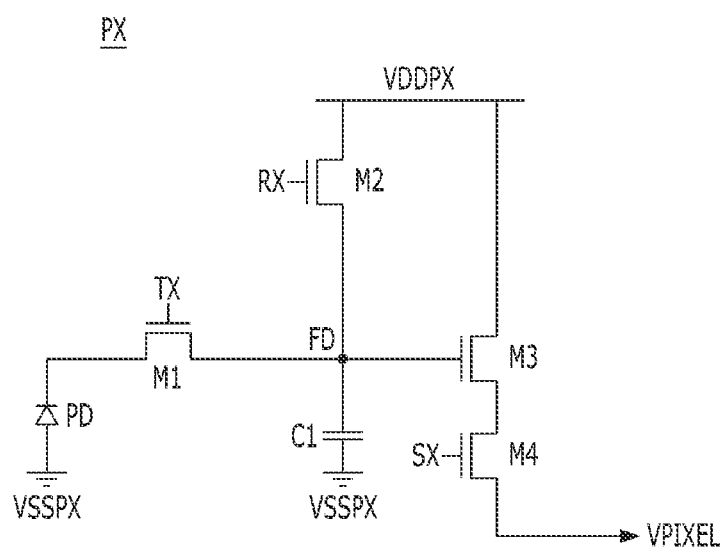
FIG. 2 is a circuit diagram illustrating a unit pixel of FIG. 1.
Figure 3:
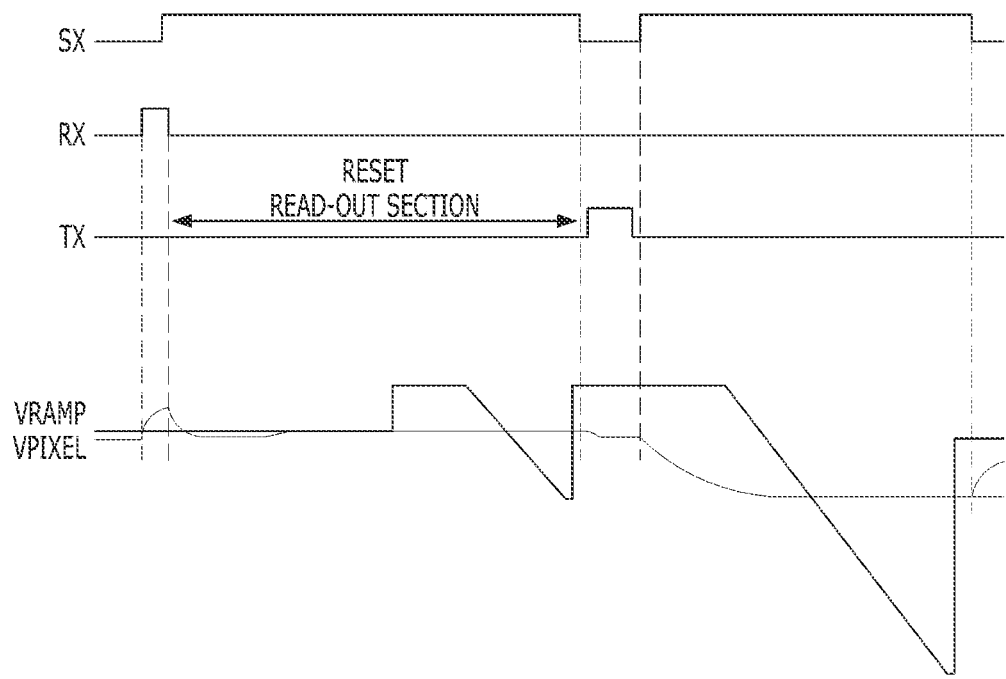
FIG. 3 is a timing diagram for explaining an operation of the unit pixel of FIG. 1.

FIG. 2 is a circuit diagram illustrating a unit pixel PX of FIG. 1. FIG. 3 is a timing diagram for explaining an operation of the unit pixel PX of FIG. 1.

Referring to FIG. 2, the unit pixel PX may include a photo-diode PD, a transfer transistor M1, a reset transistor M2, a driving transistor M3, and a selection transistor M4. The floating diffusion (FD) node may be a common node of the transfer transistor M1 and the reset transistor M2.

The photo-diode PD may perform a photoelectric conversion operation. That is, the photo-diode PD may accumulate the amount of the incident light to generate the photo charges. The transfer transistor M1 may transfer the photo charges of the photo-diode PD electrically coupled to one end thereof, to FD node electrically coupled to the other end thereof, in response to the transfer control signal TX applied to the gate of the transfer transistor M1. The reset transistor M2 may transfer a source voltage VDDPX applied from one terminal thereof, to the FD node electrically coupled to the other terminal thereof, in response to the reset signal RX applied to the gate of the reset transistor M2. That is, the reset transistor M2 may reset the photo charges stored in the FD node to a voltage level of the source voltage VDDPX in response to the reset control signal RX. The driving transistor M3 may have one terminal electrically coupled to a source voltage VDDPX terminal, generate an electrical signal corresponding to charges stored in the FD node electrically coupled to a gate terminal thereof, and output the electrical signal to the other terminal. The driving transistor M3 may serve as a source follower buffer amplifier. The selection transistor M4 may operate in response to the selection signal SX and output the electrical signal provided from the driving transistor M3 as the pixel voltage VPIXEL. The selection transistor M4 may perform a switching operation for selecting the unit pixel PX in response to the selection signal SX applied to the gate of the selection transistor M4, and an address operation.

For reference, the FD node may be a diffusion area formed at the common node of the transfer transistor M1 and the reset transistor M2. The FD node may store charges corresponding to the photo charges, or charges corresponding to an initialization voltage (i.e., the source voltage VDDPX). Therefore, the FD node may be modeled as a capacitor C1.

Meanwhile, in case of a CMOS image sensor, in order to cancel or remove an intrinsic offset value of each pixel, the CMOS image sensor may compare a pixel signal obtained before light is incident on a corresponding pixel (i.e., a reset signal) with a pixel signal obtained after light is incident on the corresponding pixel (i.e., an image signal). By doing so, the CMOS image sensor can obtain a pixel signal for each pixel, which is caused by actual incident light without influence from other light receiving pixels, for example, the offset value of each pixel. The above-mentioned scheme will hereinafter be referred to as Correlated Double Sampling (CDS) scheme.

Referring to FIG. 3, in the CDS scheme, the reset transistor M2 is turned on in response to the reset signal RX, and thus, the photo charges corresponding to the voltage level of the source voltage VDDPX are charged in the FD node. As a result, the FD node is initialized. The selection transistor M4 is turned on in response to the selection signal SX, and thus, the electrical signal provided from the FD node is outputted as the pixel voltage VPIXEL. The pixel voltage VPIXEL may be used as a reference signal. A temporal section from disablement of the reset signal RX to enablement of the transfer control signal TX, i.e., a period to which the pixel voltage VPIXEL corresponding to the reference signal is outputted, may be defined as a "reset read-out section". Since the transfer control signal TX, the reset signal RX, and the selection signal SX may be provided for each of the row lines RLn, the reset read-out section may be applied equally to other row lines.

When the transfer control signal TX is activated after the reset read-out section, the transfer transistor M1 is turned on. At this time, the selection transistor M4 is turned off in response to the selection signal SX. By turning off the selection transistor M4 while the transfer control signal TX toggles, it is possible to prevent a voltage level of the pixel voltage VPIXEL from increasing and to reduce a settling time of the pixel voltage VPIXEL. In response to the transfer control signal TX, the transfer transistor M1 is turned on so that the photo charges of the photo-diode PD are transferred to the FD node. Thereafter, the selection transistor M4 is turned on in response to the selection signal SX, and thus, the electrical signal provided from the FD node is outputted as the pixel voltage VPIXEL. The pixel voltage VPIXEL may be used as an image signal.

The read-out circuit 14 may sample the pixel voltage VPIXEL twice according to the second timing control signal CCTRL, and output the image data DOUT by converting a voltage difference between the reference signal and the image signal into the (digital signals based on the ramp voltage VRAMP.

Figure 4:
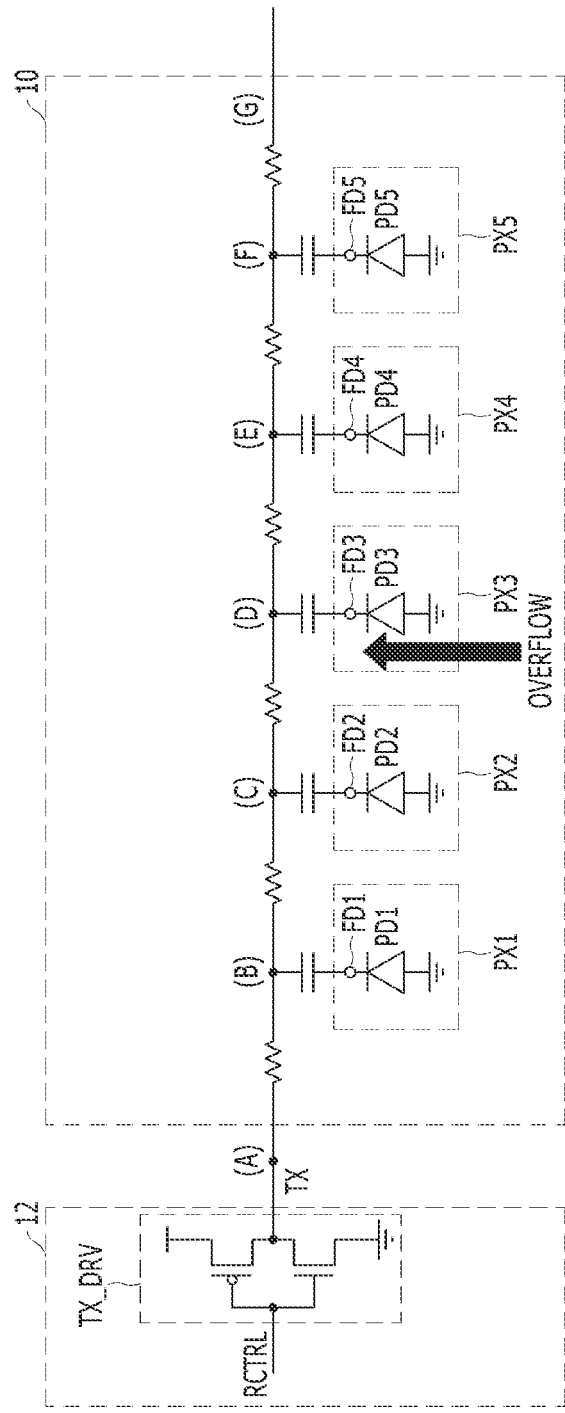
FIG. 4 is a diagram for modeling the unit pixels coupled to the same row line of the image sensing device of FIG. 1.
Figure 5A:
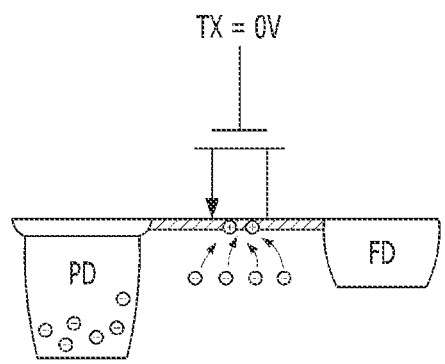
FIGS. 5A and 5B are diagrams for explaining why a transfer control signal is driven to a low voltage.
Figure 5B:
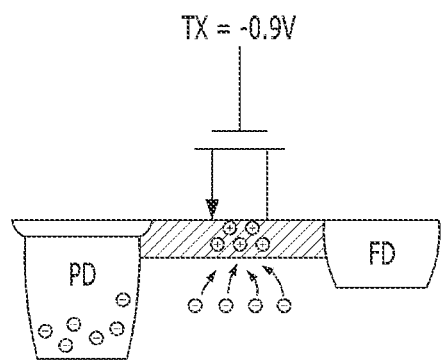
Figure 6:
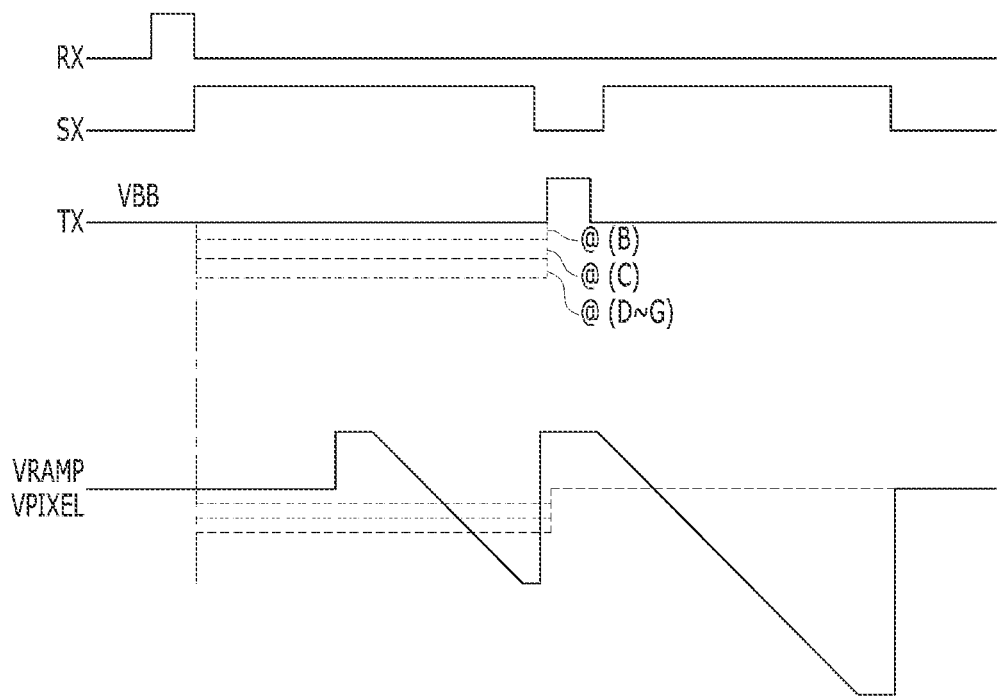
FIG. 6 is a timing diagram for explaining an operation of the unit pixels of FIG. 4.

FIG. 4 is a diagram for showing unit pixels PX1 to PX5 coupled to the same row line of the image sensing device 1 of FIG. 1. FIGS. 5A and 5B are diagrams for explaining why the transfer control signal TX is driven to a low voltage. FIG. 6 is a timing diagram for explaining an operation of the unit pixels PX1 to PX5 of FIG. 4.

Referring to FIG. 4. FIG. 4 shows a circuit that models first to fifth unit pixels PX1 to PX5 coupled through a transfer driver TX_DRV of the row control circuit 12 and a signal line (hereinafter, referred to as a "TX line") through which the transfer control signal TX is transferred. A RC component may exist between each of the first to fifth unit pixels PX1 to PX5 and the TX line.

When too strong of a light is applied to the pixel array 10, an overflow may occur where the photo charges are transferred from the photo diode PD to the FD node. A current path may be formed by the overflow, causing a change in the voltage level of the FD node. For example, when the voltage level of the FD node varies since the photo charges are transferred to the FD node of the third unit pixel PX3, it affects the voltage levels of the FD nodes of the remaining unit pixels coupled to the same row line, due to the capacitive coupling effect. As such, the noise generated by changes in the voltage level of the FD node of any unit pixel affecting the remaining unit pixels coupled to the same row line, referred to as banding noise.

In this example, the transfer transistor M1 transfers the photo charges of the photo-diode PD electrically coupled to one end thereof, to the FD node electrically coupled to the other end thereof, in response to the transfer control signal TX applied to the gate of the transfer transistor M1. Compared to a case where a voltage level of the transfer control signal TX is set to a ground voltage VSSPX level (i.e., 0V), a thickness of hole accumulation may increase in a case where a voltage level of the transfer control signal TX is set to a lower voltage level (e.g., −0.9V) than the ground voltage level. That is, as shown in FIG. 5A, the closer the voltage level of the transfer control signal TX is to the ground voltage level, the lower the current barrier between the photo-diode PD and the FD node, making it easier to form a current path due to the overflow. In contrast, as shown in FIG. 5B, the lower the voltage level of the transfer control signal TX than the ground voltage level, the higher the current barrier between the photo-diode PD and the FD node, which can significantly reduce the probability of a current path being formed due to the overflow. Therefore, by driving the transfer control signal TX to the lower voltage VBB than the ground voltage level during the reset read-out section, it is possible to prevent the transmission of the photo charges from the photo diode PD to the FD node even if too strong of a light is applied to the pixel array 10.

Referring back to FIG. 4, when the current path is formed due to the overflow, a gradient voltage drop may occur in the voltage level of the transfer control signal TX provided to the first to fifth unit pixels PX1 to PX5 from the row control circuit 12, due to a parasitic capacitance by the RC component of the TX line of the pixel array 10. For example, when the voltage level of the FD node varies since the photo charges are transferred to the FD node of the third unit pixel PX3, the gradient voltage drop may occur from an output node (A point) of the transfer driver TX_DRV to a connection node (D point) to the third unit pixel PX3. That is, as shown in FIG. 6, the voltage level of the TX line through which the transfer control signal TX is transferred may be gradually dropped from the output node of the transfer driver TX_DRV to the third unit pixel PX3. However, in this example where the overflow occurs at PD3, no further voltage drop occurs from the connection node (D point) to the third unit pixel PX3 to a connection node (G point) after the fifth unit pixel PX5. That is, the voltage level of the TX line remains constant from the connection node (D point) to the connection node (G point).

Such a change in the voltage level of the TX line, during the reset read-out section from disablement of the reset signal RX to enablement of the transfer control signal TX, may be a factor in increasing the voltage level of the pixel voltage VPIXEL corresponding to the reference signal, further aggravating the banding noise. Furthermore, as described above, the voltage drop of the transfer control signal TX, which is provided to the first to fifth unit pixels PX1 to PX5 from the row control circuit 12, is not consistent, making it difficult to compensate for the banding noise.

Hereinafter, in accordance with one embodiment of the present invention, a scheme for compensating for the banding noise by inducing a symmetric voltage drop on the same row line through the configuration of a bias compensation circuit and a row control circuit disposed on the opposite side with reference to a pixel array will be described. The bias compensation circuit is suitable for driving row control signals to a lower voltage level than a ground voltage VSSPX level during a reset read-out section, thereby preventing the handing noise.

Figure 7:
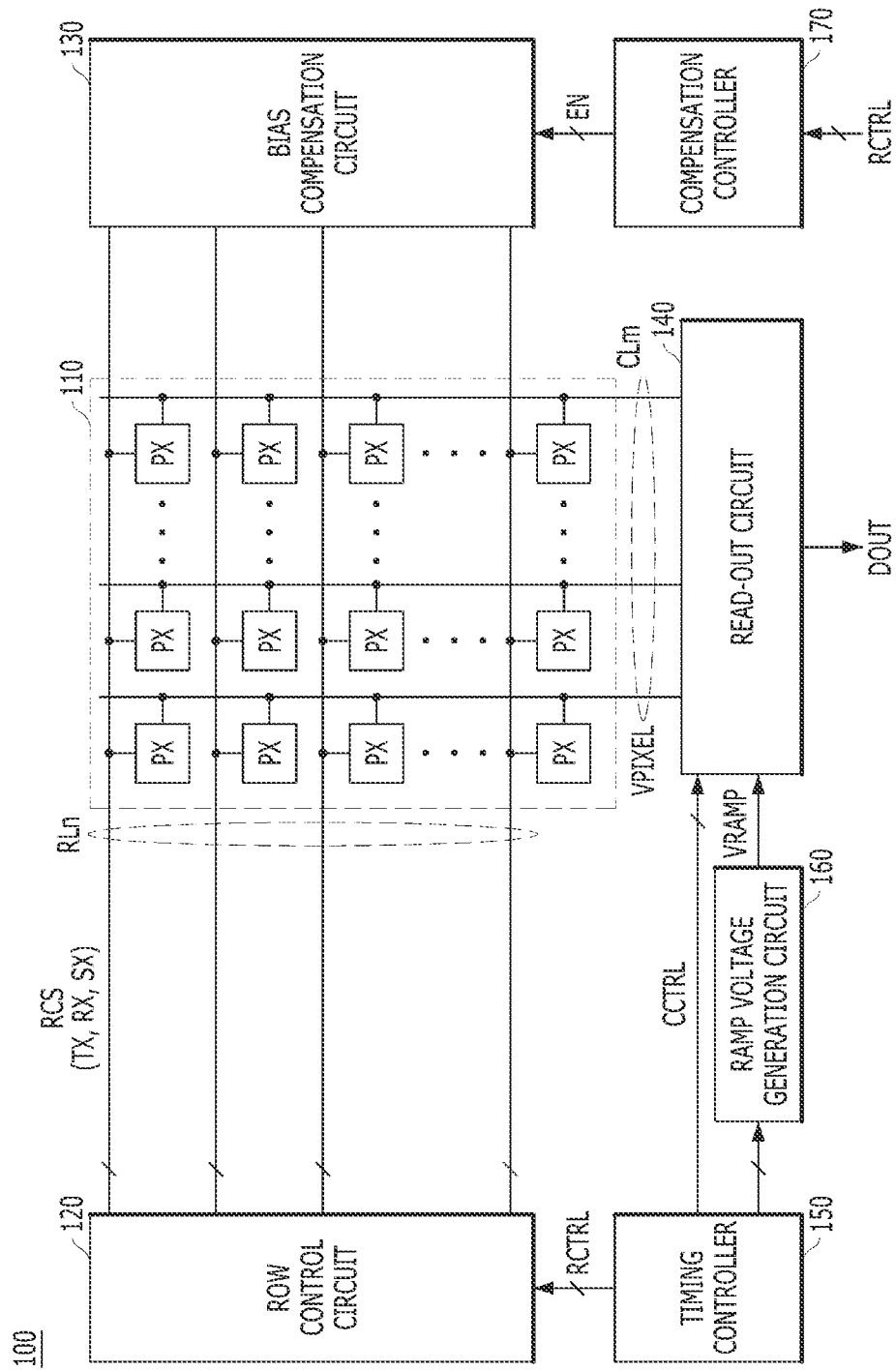
FIG. 7 is a configuration diagram illustrating an image sensing device in accordance with a first embodiment of the present invention.

FIG. 7 is a configuration diagram illustrating an image sensing device 100 in accordance with a first embodiment of the present invention.

Referring to FIG. 7, the image sensing device 100 may include a pixel array 110, a row control circuit 120, a bias compensation circuit 130, a read-out circuit 140, a timing controller 150, a ramp voltage generation circuit 160, and a compensation controller 170.

The pixel array 110 may include a plurality of unit pixels PX arranged with an array type in a row direction and a column direction. Each of the unit pixels PX may include a configuration substantially the same as that of FIG. 2, and perform an operation substantially the same as that illustrated in FIG. 3. The unit pixels PX may be coupled to the row control circuit 120 through a plurality of row lines RLn, and coupled to the read-out circuit 140 through a plurality of column lines CLm. The pixel array 110 may be controlled by row control signals RCS that are provided from the row control circuit 120 through the row lines RLn. The pixel array 110 may generate photo charges corresponding to the amount of an incident light, accumulate the generated photo charges in a floating diffusion (FD) node, and provide an electrical signal corresponding to the photo charges, as a pixel voltage VPIXEL through the column lines am by converting a voltage level of the FD node into the electrical signal.

The row control circuit 120 may be disposed at a first side of the pixel array 110. The row control circuit 120 may generate the row control signals RCS including a transfer control signal TX, a reset signal RX, and a selection signal SX, according to a first timing control signal RCTRL provided from the timing controller 150, and provide the row control signals RCS to the pixel array 110 through the row lines RLn. The row control circuit 120 may provide the row control signals RCS to unit pixels PX disposed at the same row line among the row lines RLn. In particular, the row control circuit 120 may provide the transfer control signal TX having a voltage level between a first voltage and a second voltage, to the respective row lines RLn. For example, the first voltage may have a source voltage VDDPX level, and the second voltage may have a lower voltage VBB level than a ground voltage VSSPX level. Depending on an embodiment, the first voltage may have a higher voltage VPP level than the source voltage VDDPX level, and the second voltage may have the lower voltage VBB level. The row control circuit 120 may generate the selection signal SX for selecting any one from the row lines RLn according to the first timing control signal RCTRL. The row control circuit 120 may sequentially activate the reset signal RX and the transfer control signal TX at a preset timing, and output the reset signal RX and the transfer control signal TX to the unit pixels PX coupled to the selected row line, according to the first timing control signal RCTRL.

The bias compensation circuit 130 may be disposed at a second side of the pixel array 110. The second side may be opposite to the first side with reference to the pixel array 110. That is, the row control circuit 120 and the bias compensation circuit 130 may be positioned at the opposite sides in a length direction of the row lines RLn with reference to the pixel array 110. The bias compensation circuit 130 may drive the transfer control signal TX for each of the row lines RLn to the second voltage (i.e., the lower voltage VBB level), according to a plurality of compensation enable signals EN respectively corresponding to the row lines RLn and provided from compensation controller 170.

The timing controller 150 may generate first and second timing control signal RCTRL and CCTRL including a dock signal, thereby controlling the pixel array 110, the row control circuit 120, the read-out circuit 140, the ramp voltage generation circuit 160, and the compensation controller 170. The timing controller 150 may include a logic control circuit, a phase locked loop (PLL) circuit, a timing control circuit, and a communication interface circuit.

The ramp voltage generation circuit 160 may generate a ramp voltage VRAMP that decreases (or increases) over time, depending on the control of the timing controller 150.

The read-out circuit 140 may convert the pixel voltage VPIXEL into digital signals based on the ramp voltage VRAMP according to the second timing control signal CCTRL, and output the digital signals as image data DOUT. The read-out circuit 140 may include a sampler, an analog-digital converter, and/or an output buffer. The output buffer may further include a column decoder for outputting the image data DOUT in columns.

The compensation controller 170 may generate the plurality of compensation enable signals EN in response to the first timing control signal RCTRL, Each of the compensation enable signals EN may be enabled during a reset read-out section of unit pixels PX coupled to a corresponding one of the row lines RLn. That is, the compensation enable signals EN may be enabled during the reset read-out section of a corresponding one of the row lines RLn. For reference, the reset read-out section may be defined as a time section from disablement of the reset signal RX of a corresponding row line to enablement of the transfer control signal TX, i.e., a period to which the pixel voltage VPIXEL corresponding to a reference signal is outputted. Thus, the bias compensation circuit 130 may drive the transfer control signal TX of the corresponding row line to the lower voltage VBB level.

Figure 8:
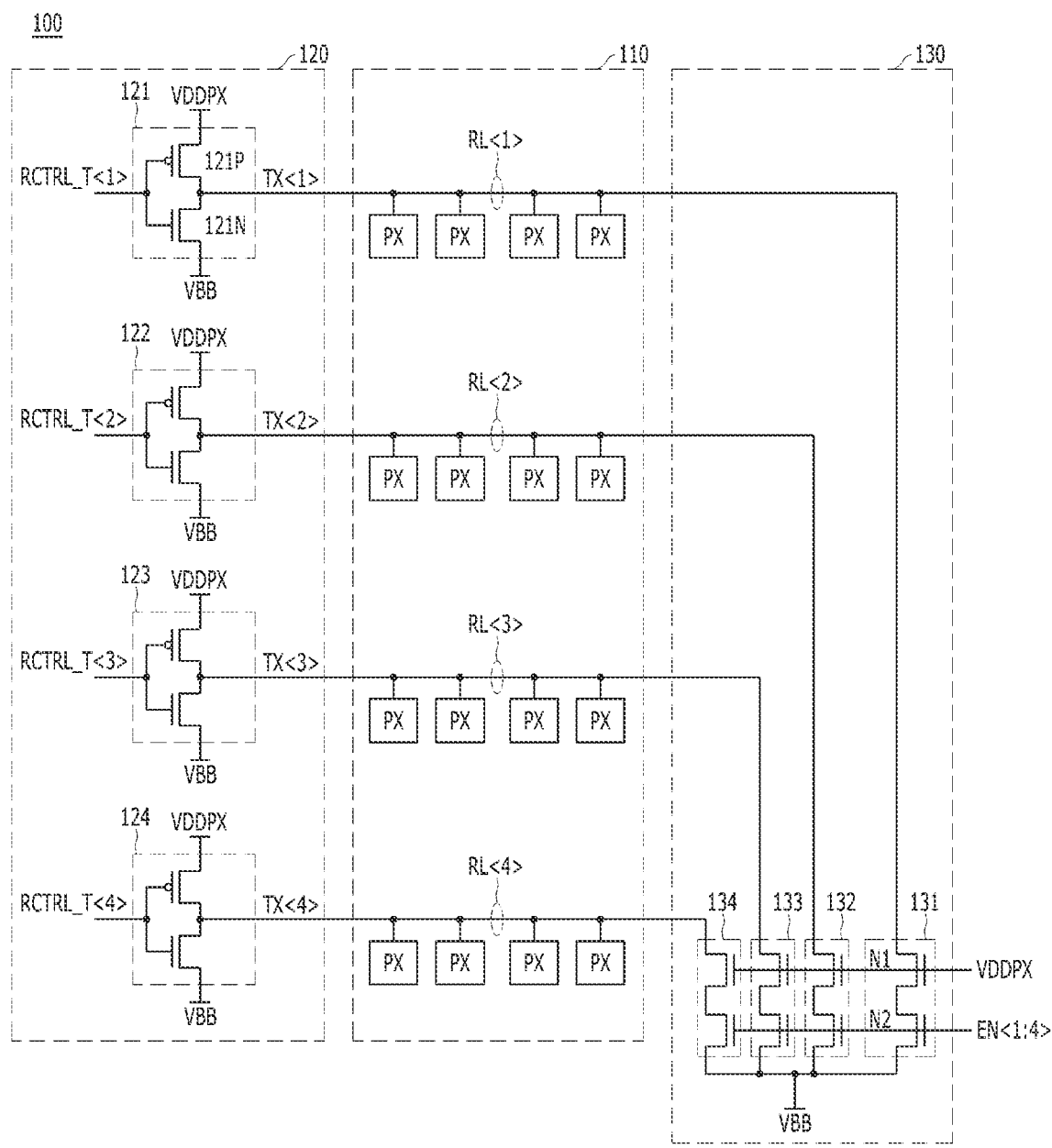
FIG. 8 is a circuit diagram illustrating a row control circuit and a bias compensation circuit of FIG. 7.

Hereinafter, a detailed configuration of the row control circuit 120 and the bias compensation circuit 130 will be explained. 4×4 unit pixels PX coupled between 4 row lines and four column lines are shown in FIGS. 7 and 8.

Figure 9:
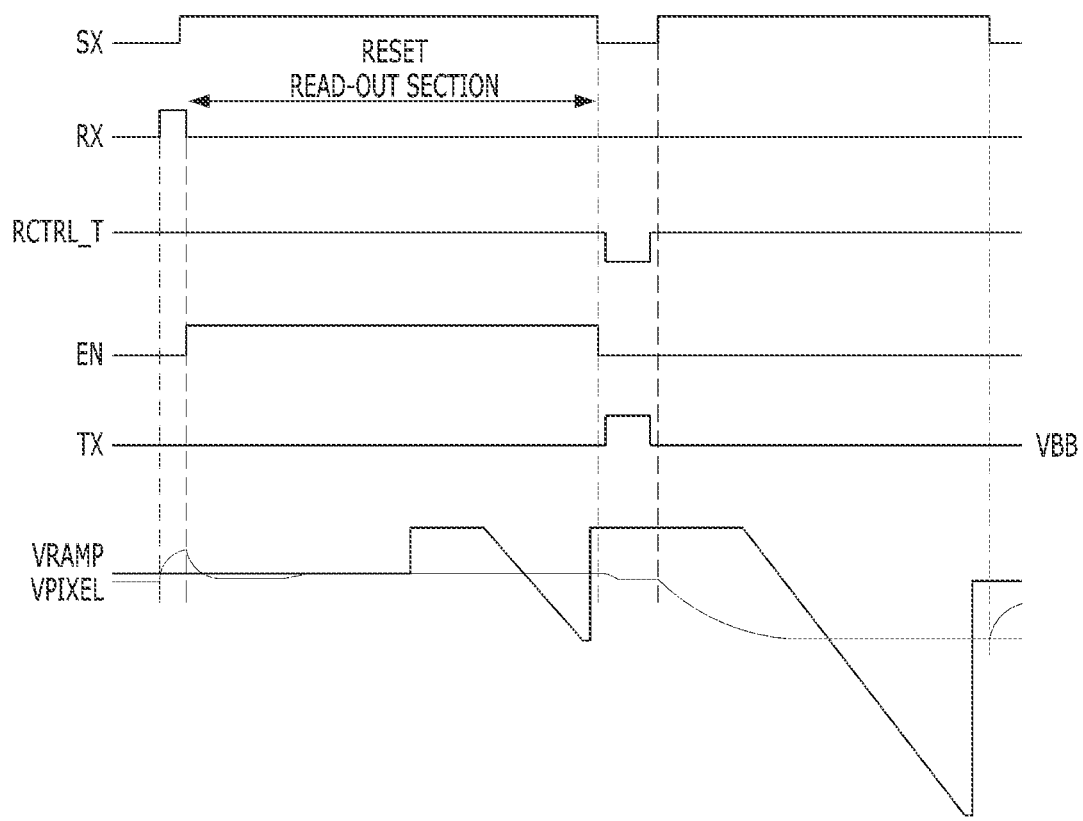
FIG. 9 is a timing diagram for explaining an operation of a unit pixel of FIG. 8.

FIG. 8 is a circuit diagram illustrating the row control circuit 120 and the bias compensation circuit 130 of FIG. 7. FIG. 9 is a timing diagram for explaining an operation of the unit pixel PX of FIG. 8.

Referring to FIG. 8, the row control circuit 120 may include first to fourth transfer drivers 121 to 124 for providing first to fourth transfer control signals TX<1:4> to first to fourth row lines RL<1:4>, respectively. For example, the first transfer driver 121 may include a PMOS transistor 121P and an NMOS transistor 121N, which are coupled between a source voltage VDDPX terminal and a lower voltage VBB terminal in series, and have gates receiving a first timing control signal RCTRL_T<1>. The first transfer control signal TX<1> may be outputted from a common node of the PMOS transistor 121P and the NMOS transistor 121N, to the pixel array 110. Depending on an embodiment, the PMOS transistor 121P and the NMOS transistor 121N may be coupled between a higher voltage VPP terminal and a lower voltage VBB terminal in series. The row control circuit 120 may further include a plurality of reset drivers for providing a plurality of reset signals RX, and a plurality of selection drivers for providing a plurality of selection signals SX.

The bias compensation circuit 130 may include first to fourth compensators 131 to 134 corresponding to the first to fourth row lines RL<1:4>, respectively. For example, the first compensator 131 may include a first compensation transistor N1 and a second compensation transistor N2, which are coupled between the first row line RL<1> and the lower voltage VBB terminal in series. The first compensation transistor N1 may have a gate receiving a source voltage VDDPX, and the second compensation transistor N2 may have a gate receiving a first compensation enable signal EN<1>. The first compensation transistor N1 and the second compensation transistor N2 may be implemented with an NMOS transistor. Since the first compensation transistor N1 operates according to the source voltage VDDPX, the gate-induced drain leakage (GIDL) current generated due to a gate-drain voltage may be reduced. According to one embodiment, the first to fourth compensators 131 to 134 may include a plurality of first compensation transistors coupled in parallel and a plurality of second compensation transistors coupled in parallel, wherein the first compensation transistors and the second compensation transistors are coupled in series between the respective row lines RL<1:4> and the lower voltage VBB terminal.

Meanwhile, each of the unit pixels PX may include a photo-diode PD, a transfer transistor M1, a reset transistor M2, a driving transistor M3 and a selection transistor M4, as described in FIG. 2. A FD node may be formed at a common node of the transfer transistor M1 and the reset transistor M2.

Referring to FIG. 9, an operation of unit pixels PX coupled to the same row line (e.g., the first row line RL<1>) is shown.

The reset transistor M2 is turned on in response to the reset signal RX, and thus, photo charges corresponding to a voltage level of the source voltage VDDPX are charged in the FD node. As a result, the FD node is initialized. The selection transistor M4 is turned on in response to the selection signal SX, and thus, an electrical signal provided from the FD node is outputted as a pixel voltage VPIXEL. The pixel voltage VPIXEL may be used as a reference signal. In response to the timing control signal RCTRL_T (e.g., the first timing control signal RCTRL_T<1>) of a logic high level, the first transfer driver 121 may drive the transfer control signal TX (e.g., the first transfer control signal TX<1>) to the lower voltage VBB.

During a reset read-out section from when the reset signal RX is disabled to when the transfer control signal TX is enabled, the compensation enable signal EN (e.g., the first compensation enable signal EN<1>) is enabled to a logic high level. Accordingly, the first compensator 131 may drive the transfer control signal TX to the lower voltage VBB. That is, one terminal of the first row line RL<1> is biased to the lower voltage VBB by the first transfer driver 121 while the other terminal of the first row line RL<1> is biased to the lower voltage VBB by the first compensator 131. Thus, even if a current path induced by an overflow is formed on any unit pixel, a symmetric voltage drop may be formed on both terminals of the same row line.

After the reset read-out section, the first transfer driver 121 may drive the transfer control signal TX to the source voltage VDDPX, and thus, the transfer transistor M1 is turned on. At this time, the selection transistor M4 is turned off in response to the selection signal SX. By turning off the selection transistor M4 while the transfer control signal TX toggles, it is possible to prevent a voltage level of the pixel voltage VPIXEL from increasing and to reduce a settling time of the pixel voltage VPIXEL. In response to the transfer control signal TX, the transfer transistor M1 is turned on so that the photo charges of the photo-diode PD are transferred to the FD node. Thereafter, the selection transistor M4 is turned on in response to the selection signal SX, and thus, the electrical signal provided from the FD node is outputted as the pixel voltage VPIXEL. The pixel voltage VPIXEL may be used as an image signal.

The read-out circuit 140 samples the pixel voltage VPIXEL twice according to the second timing control signal CCTRL, and outputs the image data DOUT by converting a voltage difference between the reference signal and the image signal into the digital signals based on the ramp voltage VRAMP.

Figure 10A:
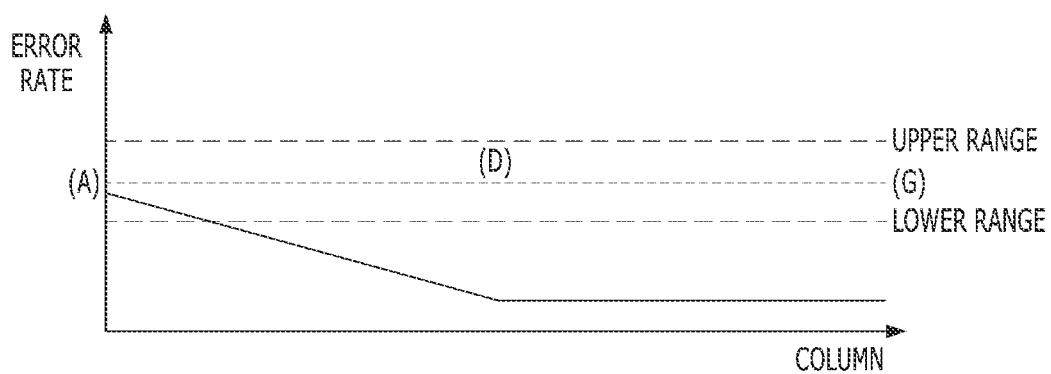
FIGS. 10A and 10B are graphs for comparing an error rate in the column direction of the unit pixels coupled to the same row line in the conventional image sensing device and an image sensing device is according to another embodiment of the present invention.
Figure 10B:
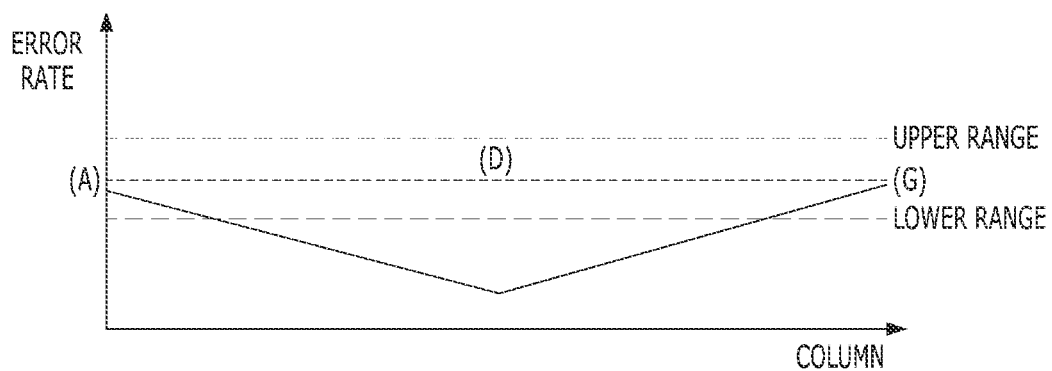

FIGS. 10A and 10B are graphs for comparing an error rate in the column direction of the unit pixels PX coupled to the same row line in the conventional image sensing device 1 and the image sensing device 100 according to the embodiment of the present invention.

Referring to FIG. 10A, in the conventional image sensing device 1, during the reset read-out section, when an overflow occurs at any unit pixel, it affects the voltage levels of the FD nodes of the remaining unit pixels coupled to the same row line, due to the capacitive coupling effect. For example, as shown in the modeling circuit of FIG. 4, when an overflow occurs at the third unit pixel PX3, the gradient voltage drop may occur from an output node (A point) of the transfer driver TX_DRV to a connection node (D point) to the third unit pixel PX3 while no further voltage drop occurs from the connection node (D point) to the third unit pixel PX3 to a connection node (G point) after the fifth unit pixel PX5. As a result, as shown in FIG. 10A, an error rate in a direction of a column is similar to a profile of the voltage drop. It is not easy to correct the error since the number of unit pixels that are not within a target range increases even if an offset value to compensate for the error relative to A point or D point is set.

In contrast to FIG. 10A, in the image sensing device 100 according to the embodiment of the present invention, during the reset read-out section, the first transfer driver 121 may bias one terminal of the first row line RL<1> to the lower voltage VBB while the first compensator 131 may bias the other terminal of the first row line RL<1> to the lower voltage VBB, thereby inducing a symmetric voltage drop on both terminals of the same row line even if a current path induced by the overflow is formed on any unit pixel. As a result, as shown in FIG. 10B, an error rate in a direction of a column also appears symmetrically similar to a profile of the voltage drop. I is relatively easy to correct the error since the number of unit pixels that are within a target range increases when an offset value to compensate for the error relative to A point or D point is set.

As described above, in accordance with the first embodiment, the image sensing device 100 may be provided with the bias compensation circuit 130 and the row control circuit 120 disposed on opposite sides with reference to the pixel array 110, thereby compensating for the banding noise by inducing a symmetric voltage drop on the same row line.

Figure 11:
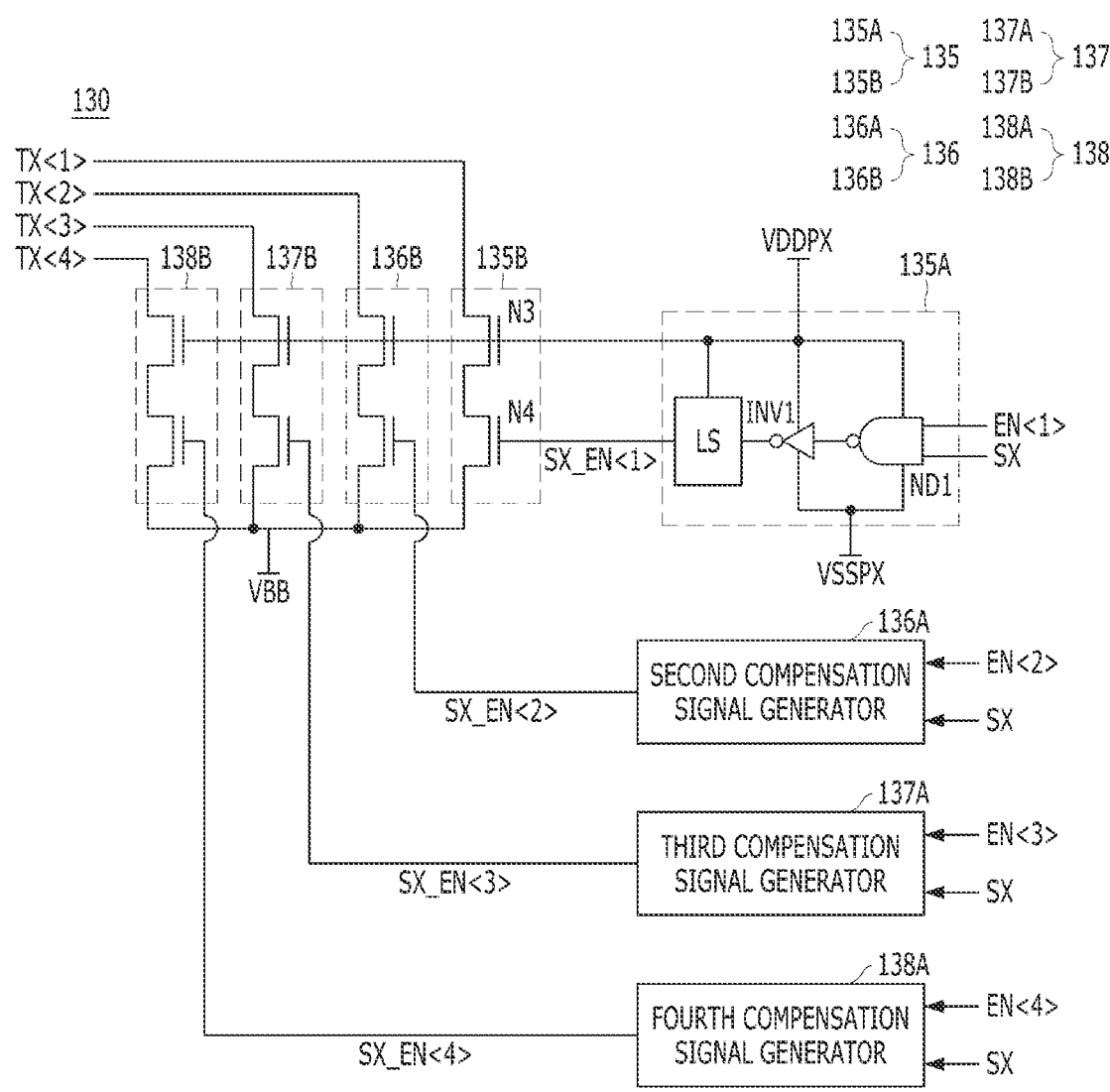
FIG. 11 is a circuit diagram illustrating a bias compensation circuit according to another embodiment of the present invention.

FIG. 11 is a circuit diagram illustrating the bias compensation circuit 130 according to another embodiment of the present invention.

Referring to FIG. 11, the bias compensation circuit 130 may include first to fourth compensation drivers 135 to 138 corresponding to the first to fourth row lines RL<1:4>, respectively. For example, the first compensation driver 135 may include a first compensation signal generator 135A and a first compensator 135B. The first compensation signal generator 135A may generate a first section determination signal SX_EN<1> according to the selection signal SX and the first compensation enable signal EN<1>.

The first compensation signal generator 135A may include a NAND gate ND1, an inverter INV1, and a level shifter LS. The NAND gate ND1 and the inverter INV1 may perform a logic AND operation on the selection signal SX and the first compensation enable signal EN<1>. The NAND gate ND1 and the inverter INV1 may output a signal having a voltage level between a source voltage VDDPX level and a ground voltage VSSPX level. The level shifter LS may output the first section determination signal SX_EN<1> that swings between the source voltage VDDPX level and a lower voltage VBB level by shifting the voltage level of the signal outputted from the inverter INV1, which swings between the source voltage VDDPX level and the ground voltage VSSPX level.

With the above configuration, the first compensation signal generator 135A may activate the first section determination signal SX_EN<1> to the lower voltage VBB level when the first compensation enable signal EN<1> is enabled in a state that the selection signal SX is enabled. Depending on an embodiment, the first compensation enable signal EN<1> may be a signal that is enabled not only for the reset read-out section, but also for other sections for different purposes.

The first compensator 135B may include a third compensation transistor N3 and a fourth compensation transistor N4, which are coupled between the first row line RL<1> and a lower voltage VBB terminal in series. The third compensation transistor N3 may have a gate receiving a source voltage VDDPX, and the fourth compensation transistor N4 may have a gate receiving the first compensation enable signal EN<1>.

As described above, the bias compensation circuit 130 may drive the row lines RL<1:4> to the lower voltage VBB level according to the selection signal SX as well as the first compensation enable signal EN<1>.

Figure 12:
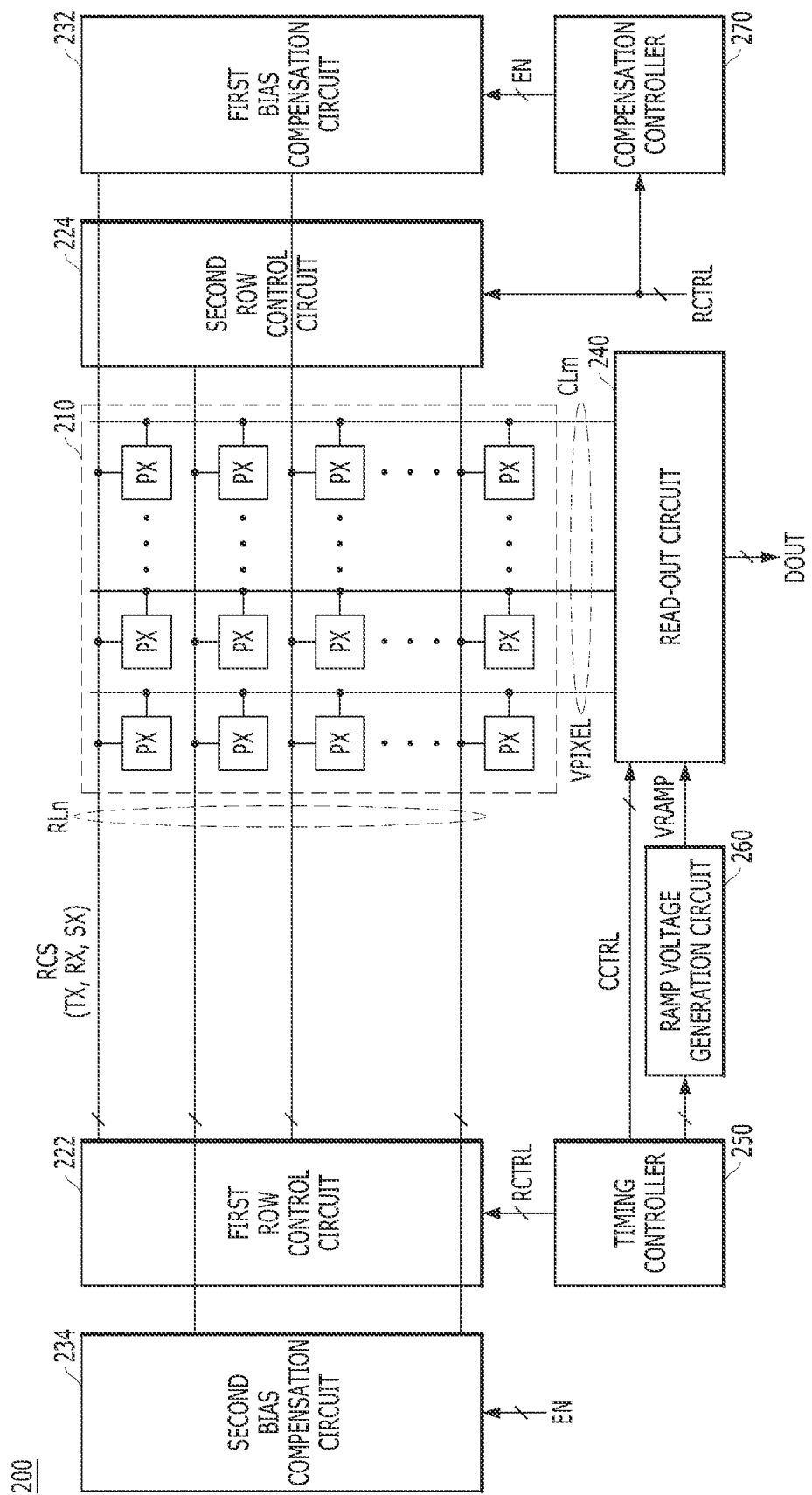
FIG. 12 is a configuration diagram illustrating an image sensing device in accordance with a second embodiment of the present invention.

FIG. 12 is a configuration diagram illustrating an it mage sensing device 200 in accordance with a second embodiment of the present invention.

Referring to FIG. 12, the image sensing device 200 may include a pixel array 210, a first row control circuit 222, a second row control circuit 224, a first bias compensation circuit 232, a second bias compensation circuit 234, a read-out circuit 240, a timing controller 250, a ramp voltage generation circuit 260, and a compensation controller 270.

The pixel array 210 may include a plurality of unit pixels PX arranged with an array type in a row direction and a column direction. Each of the unit pixels PX may include a configuration substantially the same as that of FIG. 2, and perform an operation substantially the same as that illustrated in FIG. 3.

The first row control circuit 222 may be disposed at a first side of the pixel array 210. The first row control circuit 222 may generate row control signals RCS including a transfer control signal TX, a reset signal RX, and a selection signal SX, according to a first timing control signal RCTRL provided from the timing controller 250, and provide the row control signals RCS to unit pixels PX coupled to an odd row line of row lines RLn. In particular, in the second embodiment of the present invention, the first row control circuit 222 may provide the transfer control signal TX having a voltage level between a first voltage and a second voltage, to the unit pixels PX coupled to the odd row line. For example, the first voltage may have a source voltage VDDPX level or a higher voltage VPP level than the source voltage VDDPX level, and the second voltage may have a lower voltage VBB level than a ground voltage VSSPX level.

The second row control circuit 224 may be disposed at a second side of the pixel array 210. The second side may be opposite to the first side with reference to the pixel array 210. The second row control circuit 224 may generate the row control signals RCS including the transfer control signal TX, the reset signal RX, and the selection signal SX, according to the first timing control signal RCTRL, and provide the row control signals RCS to unit pixels PX coupled to an even row line of the row lines RLn. In particular, in the second embodiment of the present invention, the second row control circuit 224 may provide the transfer control signal TX having a voltage level between the first voltage and the second voltage, to the unit pixels PX coupled to the even row line.

The first bias compensation circuit 232 may be disposed at the same side as the second row control circuit 224 with reference to the pixel array 210. That is, the first row control circuit 222 and the first bias compensation circuit 232 may be positioned at opposite sides in a length direction of the row lines RLn with reference to the pixel array 210. The first bias compensation circuit 232 may drive the transfer control signal TX to the second voltage (i.e., the lower voltage VBB level), during a reset read-out section of the odd row line. Depending on an embodiment, the first bias compensation circuit 232 may be disposed between the pixel array 210 and the second row control circuit 224.

The second bias compensation circuit 234 may be disposed at the same side as the first row control circuit 222 with reference to the pixel array 210. That is, the second row control circuit 224 and the second bias compensation circuit 234 may be positioned at opposite skies in a length direction of the row lines RLn with reference to the pixel array 210. The second bias compensation circuit 234 may drive the transfer control signal TX to the lower voltage VBB level, during the reset read-out section of the even row line. Depending on an embodiment, the second bias compensation circuit 234 may be disposed between the pixel array 210 and the first row control circuit 222.

The timing controller 250 may generate first and second timing control signal RCTRL and CCTRL, thereby controlling the pixel array 210, the first row control circuit 222, the second row control circuit 224, the read-out circuit 240, the ramp voltage generation circuit 260, and the compensation controller 270. The timing controller 150 may include a logic control circuit, a phase locked loop (PLL) circuit, a timing control circuit, and a communication interface circuit. The second timing control signal RCTRL may be divided into a first row timing control signal and a second row timing control signal. The first row timing control signal may be provided for controlling the unit pixels PX coupled to the odd row line, and the second row timing control signal may be provided for controlling the unit pixels PX coupled to the even row line.

The ramp voltage generation circuit 260 and the read-out circuit 240 may have substantially the same configuration and operation of the ramp voltage generation circuit 160 and the read-out circuit 140 of FIG. 7, respectively.

The compensation controller 270 may generate a plurality of compensation enable signals EN in response to the first timing control signal RCTRL, Each of the compensation enable signals EN may be enabled during the reset read-out section of unit pixels PX coupled to the same row line among the row lines RLn. The compensation enable signals EN may be divided into a first compensation enable signal and a second compensation enable signal. The first compensation enable signal may be enabled during the reset read-out section of the odd row line, and the second compensation enable signal may be enabled during the reset read-out section of the even row line. Thus, the first bias compensation circuit 232 may drive the transfer control signal TX to the lower voltage VBB level during the reset read-out section of the odd row line, and the second bias compensation circuit 234 may drive the transfer control signal TX to the lower voltage VBB level during the reset read-out section of the even row line.

Figure 13:
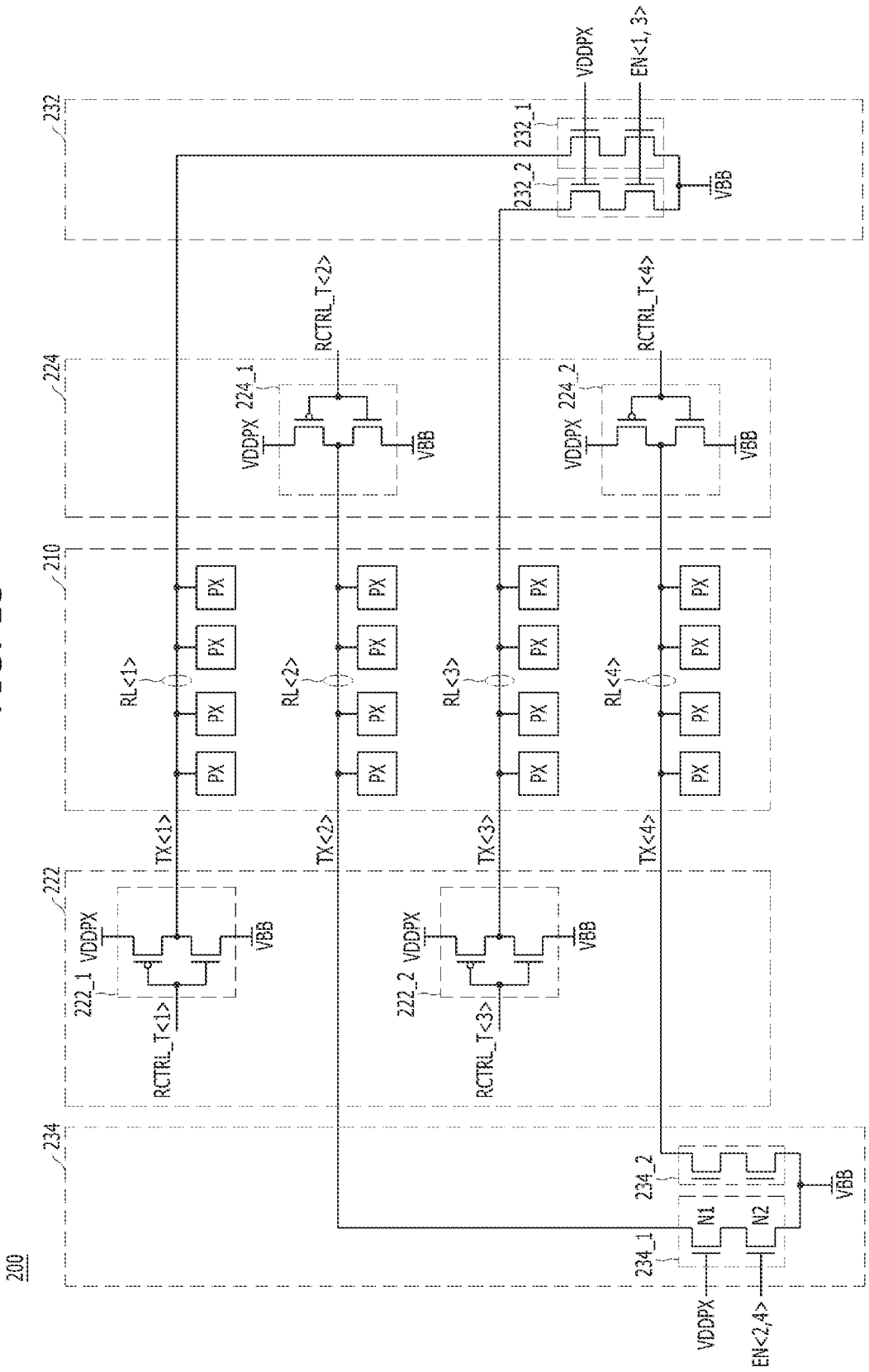
FIG. 13 is a circuit diagram illustrating first and second row control circuits and first and second bias compensation circuits of FIG. 12.

FIG. 13 is a circuit diagram illustrating the first and second row control circuits 222 and 224, and the first and second bias compensation circuits 232 and 234 of FIG. 12.

Referring to FIG. 13, the first row control circuit 222 may include a first transfer driver 222_1 and a third transfer driver 222_2 for providing a first transfer control signal TX<1> and a third transfer control signal TX<3> to the first row line RL<1> and the third row line RL<3>, respectively. The second row control circuit 224 may include a second transfer driver 224_1 and a fourth transfer driver 224_2 for providing a second transfer control signal TX<2> and a fourth transfer control signal TX<4> to the second row line RL<1> and the fourth row line RL<4>, respectively. The first row control circuit 222 and the second row control circuit 224 may further include a plurality of reset drivers for providing a plurality of reset signals RX, and a plurality of selection drivers for providing a plurality of selection signals SX. The first to fourth transfer drivers 222_1, 224_1, 222_2, and 224_2 may have substantially the same configuration and operation of the first to fourth transfer drivers 121 to 124 of FIG. 8, respectively.

The first bias compensation circuit 232 may include a first compensator 232_1 and a third compensator 232_2 corresponding to the first row line RL<1> and the third row line RL<3>, respectively. The second bias compensation circuit 234 may include a second compensator 234_1 and a fourth compensator 234_2 corresponding to the second row line RL<1> and the fourth row line RL<4>. The first to fourth compensators 232_1, 234_1, 232_2, and 234_2 may have substantially the same configuration and operation of the first to fourth compensators 131 to 134 of FIG. 8, respectively. Depending on an embodiment, the first bias compensation circuit 232 and the second bias compensation circuit 234 may be implemented with the first to fourth compensation drivers 135 to 138 of FIG. 11.

As described above, in accordance with the second embodiment, the image sensing device 200 may be provided with the first and second row control circuits 222 and 224 disposed on both sides of the pixel array 210, and may be provided with the first and second bias compensation circuits 232 and 234 disposed on the both sides of the pixel array 210 such that the first row control circuit 222 and the first bias compensation circuit 232 are disposed on the opposite sides with reference to the pixel array 210 while the second row control circuit 224 and the second bias compensation circuit 234 are disposed on the opposite sides with reference to the pixel array 210, thereby compensating for the banding noise by inducing a symmetric voltage drop on the same row line.

Criteria for determining the quality of an image sensor includes a dynamic range. In general, the dynamic range indicates a maximum range that an image sensor is capable of processing a signal without distortion of an input signal. As the dynamic range becomes wider, an image obtained by the image sensor may become clearer within a wide illuminance range. In general, in the case in which a specific color is saturated due to a narrow dynamic range, the image sensor fails to express an original color of the image. To overcome the above issue due to the narrower dynamic range, various attempts have been made to implement a wide dynamic range (WDR) pixel. For example, there is a technology that allows the image sensor to implement the WDR or to increase the capacity of the FD node while adjusting an irradiation time of an incident light.

Figure 14:
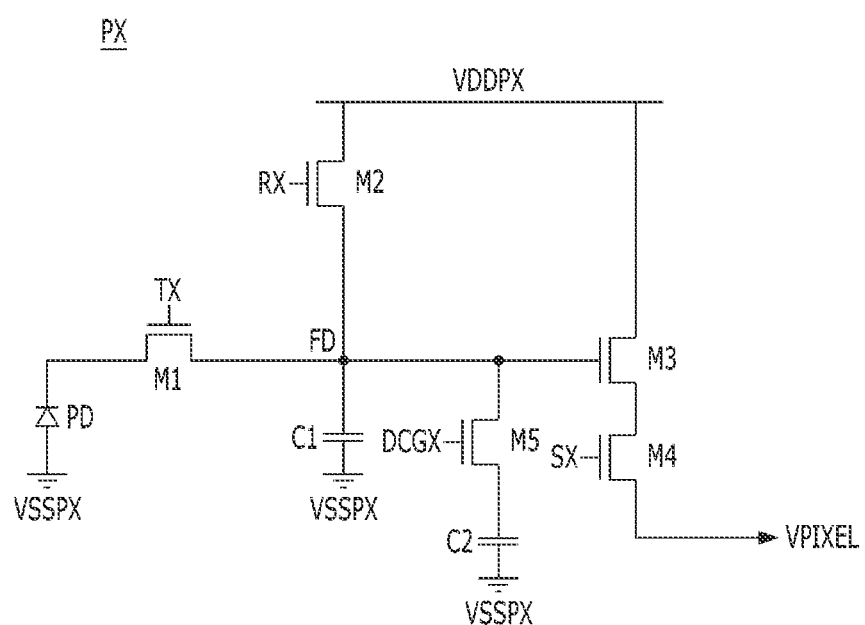
FIG. 14 is a circuit diagram illustrating a unit pixel supporting a dual conversion gain (DCG) operation.

FIG. 14 is a circuit diagram illustrating a unit pixel supporting a dual conversion gain (DCG) operation.

Referring to FIG. 14, the unit pixel PX may include a photo-diode PD, a transfer transistor M1, a reset transistor M2, a driving transistor M3, a selection transistor M4, a gain transistor M5, and a dynamic range capacitor C2. A FD node may be a diffusion area formed at the common node of the transfer transistor M1 and the reset transistor M2. The FD node may store charges corresponding to photo charges, or charges corresponding to an initialization voltage (i.e., a source voltage VDDPX). Therefore, the FD node may be modeled as a capacitor C1.

The photo-diode PD, the transfer transistor M1, the reset transistor M2, the driving transistor M3, and the selection transistor M4 of FIG. 14 may have substantially the same configurations and operations of FIG. 3.

The gain transistor M5 may transfer the photo charges stored at the FD node electrically coupled to one end thereof, to the dynamic range capacitor C2 electrically coupled to the other end thereof, in response to a gain control signal DCGX applied to the gate of the gain transistor M5.

The dynamic range capacitor C2 may be coupled between the other end of the gain transistor M5 and a ground voltage VSSPX terminal.

In a high-illuminance mode, the gain control signal DCGX is enabled to a logic high level, and the gain transistor M5 is turned on, so that the dynamic range capacitor C2 is coupled to the FD node. Thus, overflowed charges from the photo-diode PD to the FD node in the high-illuminance mode are shared by the dynamic range capacitor C2. In the high-illuminance mode, the large amount of overflowed charges from the photo-diode PD may be integrated, not discarded. For example, in this embodiment, the large amount of overflowed charges from the photo-diode PD are not discarded, but rather, are used as image information sensed under relatively high illuminance. In contrast, in a low-illuminance mode, the gain control signal DCGX is disabled, and the gain transistor M5 is turned off, so that the dynamic range capacitor C2 is electrically disconnected from the FD node. Accordingly, in this embodiment, charges transferred from the photo-diode PD to the FD node in the low-illuminance mode are stored only in the FD node. In this way, by using the gain transistor M5 and the dynamic range capacitor C2, different conversion gains may be provided in the high-illuminance mode and the low-illuminance mode, thereby achieving a high conversion gain and a low-noise characteristic.

In an image sensing device supporting the DCG operation, the gain control signal DCGX may be provided to a pixel array through a row line from a row control circuit, as one of the row control signals RCS of FIG. 7. In one embodiment, the row control circuit may drive the gain control signal DCGX to a higher voltage VPP than a source voltage VDDPX level during a reset read-out section. Thus, it is possible to compensate for the banding noise by maintaining a uniform capacitance by securing a MOS capacitance of the gain transistor M5 and a capacitance of the dynamic range capacitor C2.

Figure 15:
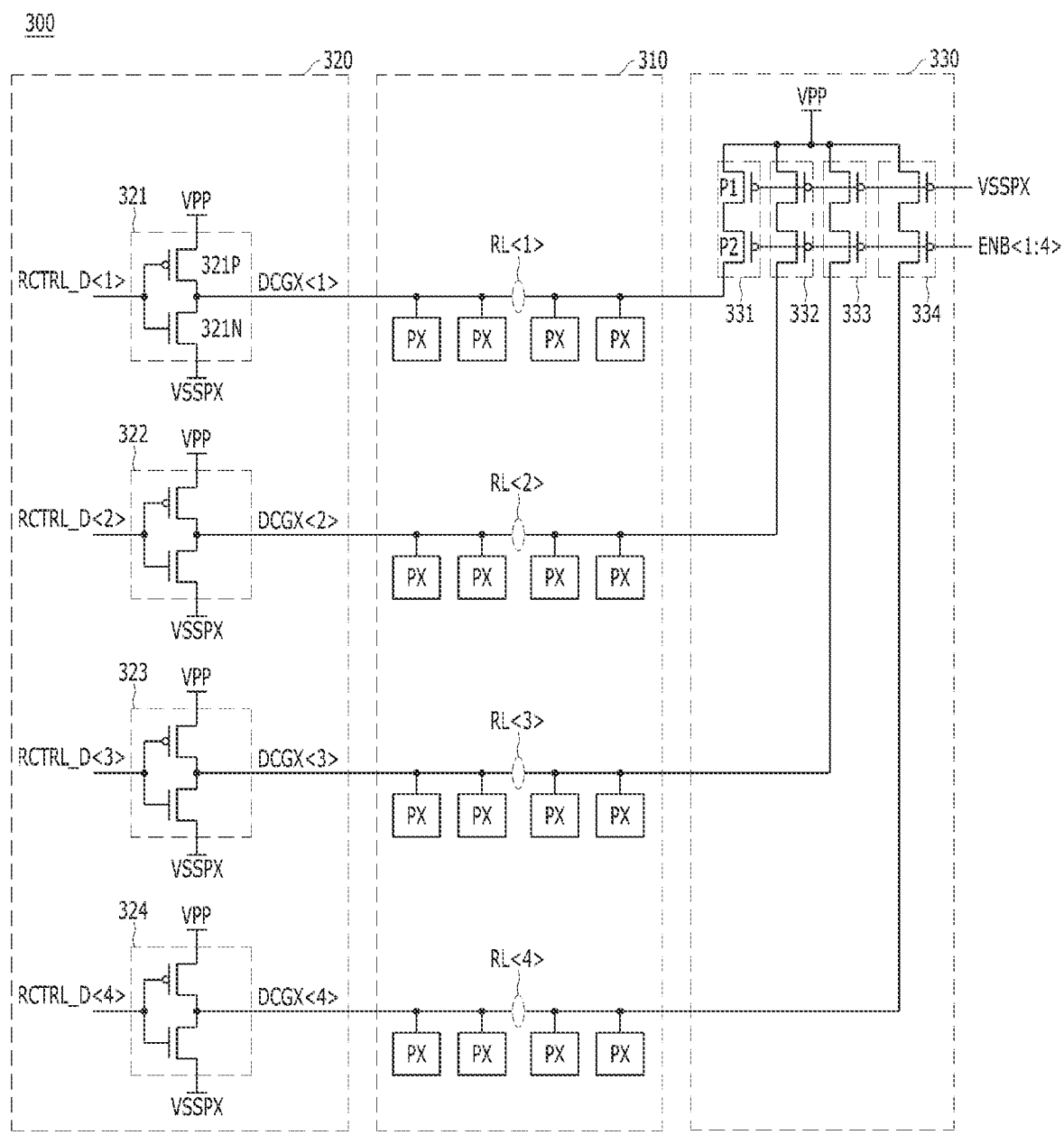
FIG. 15 is a circuit diagram illustrating a row control circuit and a bias compensation circuit included in an image sensing device in accordance with a third embodiment of the present invention.
Figure 16:
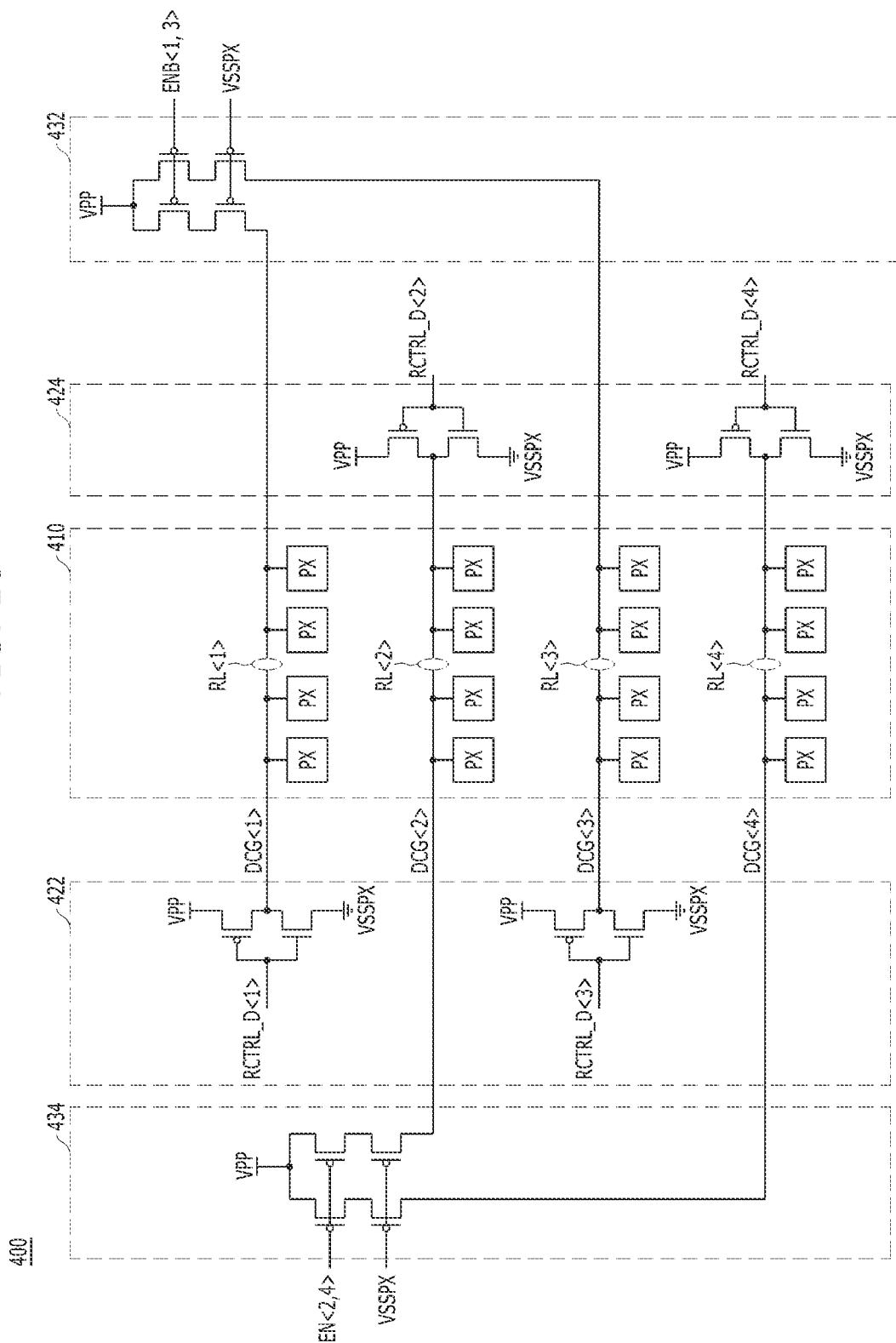
FIG. 16 is a circuit diagram illustrating first and second row control circuits and first and second bias compensation circuits included in an image sensing device in accordance with a fourth embodiment of the present invention.

Hereinafter, referring to FIGS. 15 and 16, an image sensing device supporting a DCG operation in accordance with third and fourth embodiments of the present invention will be described. 4×4 unit pixels PX coupled between 4 row lines and four column lines are shown in FIGS. 15 and 16.

FIG. 15 is a circuit diagram illustrating a row control circuit 320 and a bias compensation circuit 330 included in an image sensing device 300 in accordance with a third embodiment of the present invention.

Referring to FIG. 15, the row control circuit 320 may be disposed at a first side of a pixel array 310, and the bias compensation circuit 330 may be disposed at a second side of the pixel array 310. The row control circuit 320 and the bias compensation circuit 330 may be positioned at opposite sides in a length direction of first to fourth row lines RL<1:4> with reference to the pixel array 310.

The row control circuit 320 may provide first to fourth gain control signals DCGX<1:4> having a voltage level between a third voltage and a fourth voltage, to each of the first to fourth row lines RL<1:4>. For example, the third voltage may have a higher voltage VPP level than a source voltage VDDPX level, and the fourth voltage may have a ground voltage VSSPX level. Depending on an embodiment, the third voltage may have the higher voltage VPP level, and the fourth voltage may have a lower voltage VBB level than the ground voltage VSSPX level.

The row control circuit 320 may include first to fourth gain drivers 321 to 324 for providing the first to fourth gain control signals DCGX<1:4> to the first to fourth row lines RL<1:4>, respectively. For example, the first gain driver 321 may include a PMOS transistor 321P and an NMOS transistor 321N, which are coupled between a higher voltage VPP terminal and a ground voltage VSSPX terminal in series, and have gates receiving a first timing control signal RCTRL_D<1>. The first gain control signal DCGX<1> may be outputted from a common node of the PMOS transistor 321P and the NMOS transistor 321N, to the pixel array 310. Depending on an embodiment, the PMOS transistor 321P and the NMOS transistor 321N may be coupled between a higher voltage VPP terminal and a lower voltage VBB terminal in series. The row control circuit 320 may further include a plurality of transfer drivers for providing a plurality of transfer signals TX, a plurality of reset drivers for providing a plurality of reset signals RX, and a plurality of selection drivers for providing a plurality of selection signals SX.

The bias compensation circuit 330 may drive the first to fourth gain control signals DCGX<1:4> during a reset read-out section of each row line to the third voltage (i.e., the higher voltage VPP level), according to first to fourth inverted compensation enable signals ENB<1:4> respectively corresponding to the first to fourth row lines RL<1:4>. The bias compensation circuit 330 may include first to fourth compensators 331 to 334 corresponding to the first to fourth row lines RL<1:4>, respectively. For example, the first compensator 331 may include a first compensation transistor P1 and a second compensation transistor P2, which are coupled between the first row line RL<1> and the higher voltage VPP terminal in series. The first compensation transistor P1 may have a gate receiving a ground voltage VSSPX, and the second compensation transistor P2 may have a gate receiving the first inverted compensation enable signal ENB<1>. The first compensation transistor P1 and the second compensation transistor P2 may be implemented with a PMOS transistor. For reference, since the first compensation transistor P1 and the second compensation transistor P2 may be implemented with the PMOS transistor, the first to fourth inverted compensation enable signals ENB<1:4> of FIG. 15 may have phases opposite to the compensation enable signals EN<1:4> of FIG. 8. Since the first compensation transistor P1 operates according to the ground voltage VSSPX, the gate-induced drain leakage (GIRL) current generated due to a gate-drain voltage may be reduced.

In one embodiment, in the image sensing device 300, the row control circuit 320 may further provide the transfer control signals TX having a voltage level between a first voltage and a second voltage, to transfer transistors of unit pixels PX, through the respective row lines. For example, the first voltage may have the source voltage VDDPX level or the higher voltage VPP level, and the second voltage may have the lower voltage VBB level. The bias compensation circuit 330 may drive the transfer control signal TX to the second voltage (i.e., the lower voltage VBB level) during the reset read-out section of each row line, according to any of the compensation enable signals EN<1:4>. The bias compensation circuit 330 may receive the compensation enable signals EN<1:4> for driving the transfer control signals TX to the lower voltage VBB level, while receiving the inverted compensation enable signals ENB<1:4> for driving the gain control signals DCGX<1:4> to the higher voltage VPP level.

As described above, in accordance with the third embodiment, the image sensing device 300 supporting the DCG operation may be provided with the bias compensation circuit 330 and the row control circuit 320 disposed on the opposite sides with reference to the pixel array 310, thereby compensating for the banding noise by inducing a symmetric voltage drop on the same row line, wherein the bias compensation circuit 330 provides the gain control signal DCGX to the higher voltage VPP level during the reset read-out section of each row line.

FIG. 16 is a circuit diagram illustrating first and second row control circuits 422 and 424, and first and second bias compensation circuits 432 and 434 included in an image sensing device 400 in accordance with a fourth embodiment of the present invention.

Referring to FIG. 16, the first row control circuit 422 may be disposed at a first side of a pixel array 410. The first row control circuit 422 may respectively provide gain control signals DCG<1> and DCG<3> having a voltage level between a third voltage and a fourth voltage, to unit pixels PX coupled to odd row lines RL<1> and RL<3> among first to fourth row lines RL<1:4>.

The second row control circuit 424 may be disposed at a second side of the pixel array 410. The second side may be opposite to the first side with reference to the pixel array 410. The second row control circuit 424 may respectively provide gain control signals DCG<2> and DCG<4> having a voltage level between the third voltage and the fourth voltage, to unit pixels PX coupled to even row lines RL<2> and RL<3> among the first to fourth row lines RL<1:4>.

The first bias compensation circuit 432 may be disposed at one side of the second row control circuit 424. That is, the first row control circuit 422 and the first bias compensation circuit 432 may be positioned at the opposite sides in a length direction of the first to fourth row lines RL<1:4> with reference to the pixel array 410. The first bias compensation circuit 432 may respectively drive the gain control signal DCG<1> and DCG<3> to a higher voltage VPP level, during each reset read-out section of the odd row lines RL<1> and RL<3>. Depending on an embodiment, the first bias compensation circuit 432 may be disposed between the pixel array 410 and the second row control circuit 424.

The second bias compensation circuit 434 may be disposed at one side of the first row control circuit 422. That is, the second row control circuit 424 and the second bias compensation circuit 434 may be positioned at the opposite sides in a length direction of the first to fourth row lines RL<1:4> with reference to the pixel array 410. The second bias compensation circuit 434 may respectively drive the gain control signal DCG<2> and DCG<4> to the higher voltage VPP level, during each reset read-out section of the even row lines RL<2> and RL<4>. Depending on an embodiment, the second bias compensation circuit 434 may be disposed between the pixel array 410 and the first row control circuit 422.

The first row control circuit 422 and the second row control circuit 424 may have substantially the same configuration and operation of the row control circuit 320 of FIG. 15. The first bias compensation circuit 432 and the second bias compensation circuit 434 may have substantially the same configuration and operation of the bias compensation circuit 330 of FIG. 15.

As described above, in accordance with the fourth embodiment, the image sensing device 400 may be provided with the first and second row control circuits 422 and 424 disposed on both sides of the pixel array 410, and may be provided with the first and second bias compensation circuits 432 and 434 disposed on the both sides of the pixel array 410 such that the first row control circuit 422 and the first bias compensation circuit 432 are disposed on the opposite sides with reference to the pixel array 410 while the second row control circuit 424 and the second bias compensation circuit 434 are disposed on the opposite sides with reference to the pixel array 410, thereby compensating for the banding noise by inducing a symmetric voltage drop on the same row line.

As described above, in accordance with the embodiments of the present invention, the image sensing device may be provided with a bias compensation circuit and a row control circuit disposed on the opposite sides with reference to a pixel array, the bias compensation circuit suitable for driving row control signals to a preset voltage during a reset read-out section for each row line. Thus, it is possible to compensate for the banding noise by inducing a symmetric voltage drop on the same row line. In various embodiments of the present invention, although it is explained as an example that the bias compensation circuit for biasing the transfer control signal TX and the gain control signal DCGX is placed on the opposite side of the row control circuit, the present invention is not limited thereto. According to one embodiment, the row control circuit and a bias compensation circuit for biasing the reset signal RX or the selection signal RX may be placed on the opposite with reference to the pixel array, thereby compensating for the banding noise by inducing a symmetric voltage drop on the same row line.

It should be noted that, although the technical spirit of the disclosure has been described in connection with preferred embodiments thereof, this is merely for description purposes and should not be interpreted as limiting. It should be appreciated by one of ordinary skill in the art that various changes may be made thereto without departing from the technical spirit of the disclosure.

For example, for the logic gates and transistors provided as examples in the above-described embodiments, different positions and kinds may be implemented depending on the polarity of the input signal.

What is claimed is:

1. An image sensing device, comprising:
a pixel array including a plurality of unit pixels coupled to a plurality of row lines, wherein at least one of the unit pixels includes a photo-diode for generating photo charges corresponding to an incident light and a transfer transistor for transferring the photo charges to a floating diffusion (FD) node in response to a transfer control signal transferred through a corresponding row line;
a row control circuit disposed at a first side of the pixel array and suitable for providing, to the respective row lines, the transfer control signal having a voltage level between a first voltage and a second voltage; and
a bias compensation circuit disposed at a second side of the pixel array and suitable for driving the transfer control signal to the second voltage during a reset read-out section of each of the row lines, wherein the bias compensation circuit includes a plurality of compensators coupled to the respective row lines, and wherein at least one of the compensators includes first and second compensation transistors coupled in series between a corresponding row line and a second voltage terminal.

2. The image sensing device of claim 1,
wherein each of the unit pixels further includes a reset transistor suitable for initializing the FD node according to a reset signal provided from the row control circuit,
wherein the reset read-out section is included in a section from disablement of the reset signal to enablement of the transfer control signal.

3. The image sensing device of claim 1, wherein the first voltage has a source voltage level and the second voltage has a lower voltage level than a ground voltage level.

4. The image sensing device of claim 1, wherein the first voltage has a higher voltage level than a source voltage level and the second voltage has a lower voltage level than a ground voltage level.

5. The image sensing device of claim 1,
wherein
the first and second compensation transistors have gates respectively receiving a source voltage signal and a compensation enable signal that is enabled during the reset read-out section.

6. The image sensing device of claim 1, wherein each of the unit pixels further includes:
a driving transistor suitable for generating an electrical signal corresponding to charges stored in the FD node; and
a selection transistor suitable for outputting the electrical signal provided from the driving transistor as a pixel voltage according to a selection signal provided from the row control circuit.

7. The image sensing device of claim 6,
wherein the at least one of the compensators further includes:
a compensation signal generator suitable for generating a section determination signal based on the selection signal and a compensation enable signal that is enabled during the reset read-out section, and
wherein the first and second compensation transistors have gates respectively receiving a source voltage and the section determination signal.

8. An image sensing device, comprising:
a pixel array including a plurality of unit pixels coupled to a plurality of row lines, wherein each unit pixel includes a photo-diode for generating photo charges corresponding to an incident light and a transfer transistor for transferring the photo charges to a floating diffusion (FD) node in response to a transfer control signal transferred through a corresponding row line;
a first row control circuit disposed at a first side of the pixel array and suitable for providing, to odd row lines among the row lines, the transfer control signal having a voltage level between a first voltage and a second voltage;

a second row control circuit disposed at a second side of the pixel array and suitable for providing, to even row lines among the row lines, the transfer control signal;
a first bias compensation circuit disposed at the second side and suitable for driving the transfer control signal to the second voltage during a reset read-out section of the odd row lines; and
a second bias compensation circuit disposed at the first side and suitable for driving the transfer control signal to the second voltage during a reset read-out section of the even row lines.

9. The image sensing device of claim 8,
wherein each of the unit pixels further includes a reset transistor suitable for initializing the FD node according to a reset signal provided from the first row control circuit or the second row control circuit,
wherein the reset read-out section is included in a section from disablement of the reset signal to enablement of the transfer control signal.

10. The image sensing device of claim 8, wherein the first voltage has a source voltage level or a higher voltage level than the source voltage level and the second voltage has a lower voltage level than a ground voltage level.

11. The image sensing device of claim 8,
wherein each of the first and second bias compensation circuit includes a plurality of compensators coupled to the respective row lines, and
wherein each of the compensators includes first and second compensation transistors coupled in series between a corresponding row line and a second voltage terminal and having gates respectively receiving a source voltage and a compensation enable signal that is enabled during the reset read-out section.

12. The image sensing device of claim 8,
wherein each of the unit pixels further includes:
a driving transistor suitable for generating an electrical signal corresponding to charges stored in the FD node; and
a selection transistor suitable for outputting the electrical signal provided from the driving transistor as a pixel voltage according to a selection signal provided from the first row control circuit or the second row control circuit, and
wherein each of the first and second bias compensation circuit includes a plurality of compensators coupled to the respective row lines,
wherein each of the compensators includes:
a compensation signal generator suitable for generating a section determination signal based on the selection signal and a compensation enable signal that is enabled during the reset read-out section; and
third and fourth compensation transistors coupled in series between a corresponding row line and a second voltage terminal and having gates respectively receiving a source voltage and the section determination signal.

13. An image sensing device, comprising:
a pixel array including a plurality of unit pixels coupled to a plurality of row lines, wherein each unit pixel includes a photo-diode for generating photo charges corresponding to an incident light, a transfer transistor for transferring the photo charges to a floating diffusion (FD) node in response to a transfer control signal, and a gain transistor for coupling the FD node to a dynamic range capacitor in response to a gain control signal;
a row control circuit disposed at a first side of the pixel array and suitable for providing, to the respective row lines, the gain control signal having a voltage level between a third voltage and a fourth voltage; and
a bias compensation circuit disposed at a second side of the pixel array and suitable for driving the gain control signal to the third voltage during a reset read-out section of each of the row lines.

14. The image sensing device of claim 13,
wherein each of the unit pixels further includes a reset transistor suitable for initializing the FD node according to a reset signal provided from the row control circuit,
wherein the reset read-out section is included in a section from disablement of the reset signal to enablement of the transfer control signal.

15. The image sensing device of claim 13, wherein the third voltage has a higher voltage level than a source voltage level, and the fourth voltage has a ground voltage level or a lower voltage level than the ground voltage level.

16. The image sensing device of claim 13,
wherein the bias compensation circuit includes a plurality of compensators coupled to the respective row lines, and
wherein each of the compensators includes first and second compensation transistors coupled in series between a corresponding row line and a third voltage terminal and having gates respectively receiving a ground voltage and a compensation enable signal that is enabled during the reset read-out section.

17. The image sensing device of claim 13,
wherein each of the unit pixels further includes:
a driving transistor suitable for generating an electrical signal corresponding to charges stored in the FD node; and
a selection transistor suitable for outputting the electrical signal provided from the driving transistor as a pixel voltage according to a selection signal provided from the row control circuit,
wherein the bias compensation circuit includes a plurality of compensators coupled to the row lines, respectively, and
wherein each of the compensators includes:
a compensation signal generator suitable for generating a section determination signal based on the selection signal and a compensation enable signal that is enabled during the reset read-out section; and
third and fourth compensation transistors coupled in series between a corresponding row line and a third voltage terminal and having gates respectively receiving a ground voltage and the section determination signal.

18. The image sensing device of claim 13,
wherein the row control circuit further provides, to the respective row lines, the transfer control signal having a voltage level between a first voltage and a second voltage, and
wherein the bias compensation circuit further drives the transfer control signal to the second voltage during the reset read-out section.

19. The image sensing device of claim 18, wherein the first voltage has a source voltage level or a higher voltage level than the source voltage level and the second voltage has a lower voltage level than a ground voltage level.

20. An image sensing device, comprising:
a pixel array including a plurality of unit pixels coupled to a plurality of row lines, wherein each unit pixel includes a photo-diode for generating photo charges corresponding to an incident light, a transfer transistor for transferring the photo charges to a floating diffusion (FD) node in response to a transfer control signal, and a gain transistor for coupling the FD node to a dynamic range capacitor in response to a gain control signal;

a first row control circuit disposed at a first side of the pixel array and suitable for providing, to odd row lines among the row lines, the gain control signal having a voltage level between a third voltage and a fourth voltage;

a second row control circuit disposed at a second side of the pixel array and suitable for providing, to even row lines among the row lines, the gain control signal;

a first bias compensation circuit disposed at the second side and suitable for driving the gain control signal to the third voltage during a reset read-out section of the odd row lines; and a second bias compensation circuit disposed at the first side and suitable for driving the gain control signal to the third voltage during a reset read-out section of the even row lines.

* * * * *